United States Patent
Soriaga et al.

(10) Patent No.: US 9,312,941 B2
(45) Date of Patent: Apr. 12, 2016

(54) BASE STATIONS AND METHODS FOR FACILITATING DYNAMIC SIMULCASTING AND DE-SIMULCASTING IN A DISTRIBUTED ANTENNA SYSTEM

(75) Inventors: Joseph B. Soriaga, San Diego, CA (US); Christopher Gerard Lott, San Diego, CA (US); Jing Sun, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 13/461,299

(22) Filed: May 1, 2012

(65) Prior Publication Data

US 2013/0095871 A1 Apr. 18, 2013

Related U.S. Application Data

(60) Provisional application No. 61/547,639, filed on Oct. 14, 2011, provisional application No. 61/576,836, filed on Dec. 16, 2011.

(51) Int. Cl.
*H04B 15/00* (2006.01)
*H04B 7/06* (2006.01)
(Continued)

(52) U.S. Cl.
CPC .............. *H04B 7/0691* (2013.01); *H04W 16/12* (2013.01); *H04W 72/005* (2013.01)

(58) Field of Classification Search
CPC ........................... H04H 20/67; H04W 84/022
USPC ......................................................... 455/503
See application file for complete search history.

(56) References Cited

U.S. PATENT DOCUMENTS

| 4,144,496 A | 3/1979 | Cunningham et al. |
| 4,918,437 A | 4/1990 | Jasinski et al. |

(Continued)

FOREIGN PATENT DOCUMENTS

| GB | 2394864 A | 5/2004 |
| JP | H10285646 A | 10/1998 |

(Continued)

OTHER PUBLICATIONS

Chakrabarti A., et al., "Repeaters and Remote Radioheads in EVDO Networks", Vehicular Technology Conference Fall (VTC 2010-Fall), 2010 IEEE 72nd, IEEE, Piscataway, NJ, USA, Sep. 6, 2010, pp. 1-6, XP031770505, ISBN: 978-1-4244-3573-9.

(Continued)

*Primary Examiner* — Hai V Nguyen
(74) *Attorney, Agent, or Firm* — Liberty E. Mann

(57) ABSTRACT

Base stations may include a plurality of antenna ports adapted to communicatively couple to respective remote antenna units. A base station simulcast controller module may be coupled with each antenna port, and may be adapted to transmit downlink transmissions over a plurality of remote antenna units, with two or more of the remote antenna units simulcasting downlink transmissions as a simulcasting group. In response to one or more obtained network traffic parameters, the base station simulcast controller module may modify the simulcasting group to include at least one different remote antenna unit. Methods operational on base station may include transmitting downlink transmissions over a plurality of remote antenna units, where two or more of the remote antenna units form a simulcasting group. The simulcasting group can be modified to include at least one different remote antenna unit in response to one or more obtained network traffic parameters.

27 Claims, 15 Drawing Sheets

(51) Int. Cl.
*H04W 16/12* (2009.01)
*H04W 72/00* (2009.01)

(56) References Cited

U.S. PATENT DOCUMENTS

| | | | |
|---|---|---|---|
| 4,968,966 A | 11/1990 | Jasinski et al. | |
| 5,280,472 A | 1/1994 | Gilhousen et al. | |
| 5,513,176 A | 4/1996 | Dean et al. | |
| 5,682,256 A | 10/1997 | Motley et al. | |
| 5,724,662 A * | 3/1998 | Goldberg | H04H 20/67 340/7.27 |
| 5,802,173 A | 9/1998 | Hamilton-Piercy et al. | |
| 5,805,983 A | 9/1998 | Naidu et al. | |
| 5,809,395 A | 9/1998 | Hamilton-Piercy et al. | |
| 5,822,324 A | 10/1998 | Kostresti et al. | |
| 5,831,975 A | 11/1998 | Chen et al. | |
| 5,953,670 A * | 9/1999 | Newson | H04B 7/2609 370/466 |
| 5,995,492 A | 11/1999 | Klein et al. | |
| 6,023,625 A * | 2/2000 | Myers, Jr. | H04W 88/085 455/446 |
| 6,055,436 A | 4/2000 | Powell, II et al. | |
| 6,097,704 A | 8/2000 | Jackson et al. | |
| 6,128,470 A * | 10/2000 | Naidu | H04B 7/0802 455/14 |
| 6,178,210 B1 | 1/2001 | Craig et al. | |
| 6,272,132 B1 | 8/2001 | Ofek et al. | |
| 6,415,132 B1 * | 7/2002 | Sabat, Jr. | H04B 10/25755 455/3.01 |
| 6,480,522 B1 | 11/2002 | Hoole et al. | |
| 6,504,831 B1 * | 1/2003 | Greenwood | H04B 10/25755 340/505 |
| 6,557,111 B1 | 4/2003 | Theimer et al. | |
| 6,587,781 B2 | 7/2003 | Feldman et al. | |
| 6,683,887 B1 | 1/2004 | Huang et al. | |
| 6,765,898 B1 * | 7/2004 | Bloch | H04B 7/08 370/342 |
| 6,785,558 B1 * | 8/2004 | Stratford | H04L 1/0625 455/522 |
| 7,047,009 B2 | 5/2006 | Laroia et al. | |
| 7,079,809 B1 * | 7/2006 | Scherzer | H01Q 3/24 455/101 |
| 7,127,043 B2 | 10/2006 | Morris | |
| 7,136,653 B2 * | 11/2006 | Lemke | H04W 88/08 455/444 |
| 7,149,678 B2 | 12/2006 | Gurevich et al. | |
| 7,248,606 B2 | 7/2007 | Sato | |
| 7,283,835 B2 | 10/2007 | Kim | |
| 7,286,507 B1 | 10/2007 | Oh et al. | |
| 7,315,532 B2 | 1/2008 | Aaltonen et al. | |
| 7,376,425 B2 | 5/2008 | Laroia et al. | |
| 7,555,300 B2 | 6/2009 | Scheinert et al. | |
| 7,561,671 B2 | 7/2009 | Morris | |
| 7,573,862 B2 | 8/2009 | Chambers et al. | |
| 7,603,141 B2 | 10/2009 | Dravida | |
| 7,660,275 B2 | 2/2010 | Vijayan et al. | |
| 7,715,846 B2 * | 5/2010 | Ji | H04W 16/02 370/203 |
| 7,756,521 B2 * | 7/2010 | Gerlach | H04L 5/0046 455/422.1 |
| 7,761,093 B2 | 7/2010 | Sabat, Jr. et al. | |
| 7,774,495 B2 | 8/2010 | Pabla et al. | |
| 7,805,073 B2 | 9/2010 | Sabat, Jr. et al. | |
| 7,920,858 B2 | 4/2011 | Sabat, Jr. et al. | |
| 7,929,905 B1 * | 4/2011 | Warner | H04B 7/2606 455/10 |
| 7,957,743 B2 | 6/2011 | Moe et al. | |
| 7,969,965 B2 | 6/2011 | Bianchi et al. | |
| 8,010,116 B2 * | 8/2011 | Scheinert | H04B 7/0691 370/328 |
| 8,041,335 B2 | 10/2011 | Khetawat et al. | |
| 8,081,999 B2 | 12/2011 | Vaittinen et al. | |
| 8,135,273 B2 | 3/2012 | Sabat, Jr. et al. | |
| 8,160,570 B2 | 4/2012 | Sabat, Jr. et al. | |
| 8,165,100 B2 | 4/2012 | Sabat et al. | |
| 8,195,157 B2 * | 6/2012 | Rossetti | H04W 60/04 379/329 |
| 8,279,858 B2 | 10/2012 | Ho et al. | |
| 8,290,483 B2 | 10/2012 | Sabat, Jr. et al. | |
| 8,306,563 B2 | 11/2012 | Zavadsky et al. | |
| 8,331,309 B2 * | 12/2012 | Marsh | H04W 4/00 370/330 |
| 8,364,087 B2 | 1/2013 | Brisebois et al. | |
| 8,391,885 B2 | 3/2013 | Song et al. | |
| 8,406,145 B2 | 3/2013 | Kuwahara | |
| 8,416,802 B2 | 4/2013 | Jin et al. | |
| 8,422,356 B2 * | 4/2013 | Kishiyama | H04J 11/005 370/210 |
| 8,472,579 B2 | 6/2013 | Uyehara et al. | |
| 8,520,501 B2 | 8/2013 | Han et al. | |
| 8,532,242 B2 | 9/2013 | Fischer et al. | |
| 8,532,567 B2 | 9/2013 | Moeglein et al. | |
| 8,559,939 B2 | 10/2013 | Sabat, Jr. et al. | |
| 8,588,819 B2 | 11/2013 | Issa et al. | |
| 8,634,323 B2 * | 1/2014 | Soriaga | H04W 88/085 370/252 |
| 8,665,873 B2 | 3/2014 | Sarikaya et al. | |
| 8,681,715 B2 | 3/2014 | Murakami et al. | |
| 8,688,131 B2 * | 4/2014 | Soriaga | H04B 7/0691 370/343 |
| 8,693,342 B2 | 4/2014 | Uyehara et al. | |
| 8,693,525 B2 | 4/2014 | Rick et al. | |
| 8,774,181 B1 | 7/2014 | Zhang et al. | |
| 8,805,182 B2 | 8/2014 | Sabat, Jr. et al. | |
| 8,817,848 B2 * | 8/2014 | Lemson | H04B 10/25753 370/279 |
| 8,837,659 B2 | 9/2014 | Uyehara et al. | |
| 8,855,036 B2 | 10/2014 | Sabat et al. | |
| 8,855,704 B2 * | 10/2014 | Sambhwani | H04W 48/20 455/434 |
| 8,873,585 B2 | 10/2014 | Oren et al. | |
| 8,908,607 B2 | 12/2014 | Kummetz et al. | |
| RE45,321 E | 1/2015 | Fischer et al. | |
| 8,958,789 B2 | 2/2015 | Bauman et al. | |
| 8,965,296 B2 | 2/2015 | Brisebois et al. | |
| 8,983,301 B2 | 3/2015 | Baker et al. | |
| 9,001,811 B2 | 4/2015 | Wala et al. | |
| 9,019,929 B2 | 4/2015 | Berlin et al. | |
| 9,148,203 B2 * | 9/2015 | Lemson | H04B 10/25753 |
| 2001/0036163 A1 | 11/2001 | Sabat et al. | |
| 2002/0075906 A1 | 6/2002 | Cole et al. | |
| 2002/0114038 A1 * | 8/2002 | Arnon | H04B 10/1125 398/115 |
| 2002/0191565 A1 * | 12/2002 | Mani | H04B 10/25755 370/334 |
| 2003/0036384 A1 | 2/2003 | Chen et al. | |
| 2003/0091045 A1 | 5/2003 | Choi et al. | |
| 2004/0096222 A1 | 5/2004 | Cagenius | |
| 2005/0063324 A1 | 3/2005 | O'Neill et al. | |
| 2005/0114903 A1 | 5/2005 | Ahmed et al. | |
| 2006/0034335 A1 | 2/2006 | Karaoguz et al. | |
| 2006/0182072 A1 * | 8/2006 | Ransome | H04W 84/12 370/338 |
| 2006/0193373 A1 | 8/2006 | Agee et al. | |
| 2006/0209752 A1 * | 9/2006 | Wijngaarden | H04W 4/04 370/328 |
| 2007/0082656 A1 | 4/2007 | Stieglitz et al. | |
| 2007/0249380 A1 * | 10/2007 | Stewart | H04B 7/022 455/502 |
| 2008/0119198 A1 | 5/2008 | Hettstedt et al. | |
| 2008/0145056 A1 | 6/2008 | Boldi et al. | |
| 2008/0259826 A1 | 10/2008 | Struhsaker | |
| 2009/0005096 A1 * | 1/2009 | Scheinert | H04B 7/0874 455/513 |
| 2009/0023382 A1 | 1/2009 | Yoshida et al. | |
| 2009/0154621 A1 * | 6/2009 | Shapira | G01S 3/023 375/347 |
| 2009/0191891 A1 | 7/2009 | Ma et al. | |
| 2009/0238566 A1 * | 9/2009 | Boldi | H04W 88/085 398/59 |
| 2010/0128676 A1 * | 5/2010 | Wu | H04L 45/308 370/328 |
| 2010/0144337 A1 | 6/2010 | Dean | |
| 2010/0177759 A1 | 7/2010 | Fischer et al. | |

(56) References Cited

U.S. PATENT DOCUMENTS

| | | |
|---|---|---|
| 2010/0202356 A1 | 8/2010 | Fischer et al. |
| 2010/0208656 A1 | 8/2010 | Oh |
| 2010/0238984 A1 | 9/2010 | Sayana et al. |
| 2010/0260134 A1 | 10/2010 | Heath, Jr. et al. |
| 2010/0273468 A1 | 10/2010 | Bienas et al. |
| 2010/0330940 A1 | 12/2010 | Sheynblat et al. |
| 2011/0105184 A1* | 5/2011 | Piirainen ............... H04W 24/02 455/562.1 |
| 2011/0122788 A1* | 5/2011 | Sombrutzki .......... H04W 16/10 370/252 |
| 2011/0124347 A1* | 5/2011 | Chen ..................... H04W 64/00 455/456.1 |
| 2011/0135308 A1* | 6/2011 | Tarlazzi ............... H04B 7/0413 398/79 |
| 2011/0149929 A1 | 6/2011 | Kleider et al. |
| 2011/0183669 A1 | 7/2011 | Kazmi |
| 2011/0201368 A1* | 8/2011 | Faccin ................. H04B 7/0413 455/507 |
| 2011/0269449 A1 | 11/2011 | Kazmi et al. |
| 2012/0039320 A1* | 2/2012 | Lemson ................ H03F 1/3247 370/338 |
| 2012/0230178 A1* | 9/2012 | Wang .................... H04L 1/0627 370/216 |
| 2012/0263152 A1 | 10/2012 | Fischer et al. |
| 2012/0282936 A1 | 11/2012 | Gao et al. |
| 2013/0003658 A1 | 1/2013 | Stewart et al. |
| 2013/0003714 A1 | 1/2013 | Cannon et al. |
| 2013/0071112 A1 | 3/2013 | Melester et al. |
| 2013/0094425 A1* | 4/2013 | Soriaga ............... H04W 88/085 370/312 |
| 2013/0094454 A1* | 4/2013 | Soriaga ............... H04B 7/0691 370/329 |
| 2013/0095873 A1* | 4/2013 | Soriaga ................ H04B 7/024 455/509 |
| 2013/0176968 A1 | 7/2013 | Heath, Jr. et al. |
| 2013/0188753 A1 | 7/2013 | Tarlazzi et al. |
| 2013/0223350 A1* | 8/2013 | Kang ..................... H04B 7/024 370/328 |
| 2013/0288692 A1* | 10/2013 | Dupray ................. H04W 64/00 455/450 |
| 2014/0072064 A1* | 3/2014 | Lemson ........... H04B 10/25753 375/267 |
| 2015/0057039 A1 | 2/2015 | Soriaga et al. |
| 2015/0078471 A1* | 3/2015 | Lemson ........... H04B 10/25753 375/267 |
| 2015/0358054 A1* | 12/2015 | Lemson ........... H04B 10/25753 455/562.1 |

FOREIGN PATENT DOCUMENTS

| | | |
|---|---|---|
| JP | 2009206735 A | 9/2009 |
| JP | 2010187398 A | 8/2010 |
| JP | 2010193189 A | 9/2010 |
| JP | 2010532630 A | 10/2010 |
| JP | 2011514715 A | 5/2011 |
| JP | 2012517768 A | 8/2012 |
| WO | 9820619 A1 | 5/1998 |
| WO | 2004032548 A1 | 4/2004 |
| WO | WO-2009002331 A1 | 12/2008 |
| WO | WO-2009097237 A1 | 8/2009 |
| WO | 2010093613 A2 | 8/2010 |
| WO | 2012024345 A2 | 2/2012 |

OTHER PUBLICATIONS

International Search Report and Written Opinion—PCT/US2012/060048—ISA/EPO—Jan. 2, 2013.

Ni, J., et al., "Distributed Antenna Systems and Their Applications in 4G Wireless Systems", Communications Workshops (ICC), 2011 IEEE International Conference on, IEEE, Jun. 5, 2011, pp. 1-4, XP031909310, DOI: 10.1109/ICCW.2011.5963593 ISBN:978-1-61284-954-6.

* cited by examiner

BASE STATIONS AND METHODS FOR FACILITATING DYNAMIC SIMULCASTING AND DE-SIMULCASTING IN A DISTRIBUTED ANTENNA SYSTEM

CLAIM OF PRIORITY UNDER 35 U.S.C. §119

The present application for patent claims priority to Provisional Application No. 61/547,639 entitled "Base Station Modem Architecture for Simulcasting and De-Simulcasting in a Distributed Antenna System" filed Oct. 14, 2011, and assigned to the assignee hereof and hereby expressly incorporated by reference herein. The present application for patent also claims priority to Provisional Application No. 61/576,836 entitled "Devices, Methods, and Systems for Simulcasting in Distributed Antenna Systems (DAS) to Improve Network Utilization" filed Dec. 16, 2011, and assigned to the assignee hereof and hereby expressly incorporated by reference herein.

TECHNICAL FIELD

Aspects of the present disclosure relate generally to wireless communication systems, and more particularly, to simulcasting and de-simulcasting of transmissions in wireless communication systems.

BACKGROUND

In conventional wireless communication systems, base transceiver stations (BTS or base station) facilitate wireless communication between mobile units (e.g. access terminals) and an access network. A typical base station includes multiple transceiver units and antennas for sending radio signals to the mobile units (i.e., downlink transmissions) and for receiving radio signals from the mobile units (i.e., uplink transmissions). Base stations are typically located so as to strategically maximize communications coverage over large geographical areas. Typically, the base stations are communicatively coupled to the telephone network via backhaul connections.

As requirements for the reliability and the throughput of wireless communication systems continue to increase, solutions and methods for providing high data rate cellular access with high quality-of-service are desired. In some environments, a distributed antenna system (DAS) may be employed, where instead of covering an area by only one base station, the same coverage is provided by multiple remote antenna units (RAU) controlled by a common base station. In other words, a distributed antenna system (DAS) is a network where spatially separated antenna nodes or remote antenna units (RAUs) are connected to a common source via a transport medium. A wireless communication system employing a distributed antenna system (DAS) may thus provide improved wireless service within a geographical area or structure. Some advantages of a distributed antenna system (DAS) architecture configuration include, for example, improved reliability, reduced total power, possibility of increased capacity and more frequently occurring line-of-sight (LOS) condition between the remote antenna units (RAU) and the terminal device.

Although a distributed antenna system (DAS) architecture can provide a number of benefits to a wireless communication system, the full potential for such distributed antenna systems (DAS) can be expanded by additional features.

SUMMARY

One or more aspects of the present disclosure provide base stations adapted to facilitate simulcasting and de-simulcasting in a distributed antenna system (DAS) architecture for a wireless communication system. According to one or more examples, such base stations may include a plurality of antenna ports, each adapted to be communicatively coupled to a respective remote antenna unit. A base station simulcast controller module may be coupled with each of the plurality of antenna ports. The base station simulcast controller module can be adapted to transmit downlink transmissions over a plurality of remote antenna units communicatively coupled to the antenna ports, where at least two remote antenna units are employed for simulcasting downlink transmissions as a simulcasting group. The base station simulcast controller module may obtain one or more network traffic parameters, and may modify the simulcasting group to include at least one different remote antenna unit for simulcasting downlink transmissions in response to the one or more network traffic parameters.

Yet further aspects of the present disclosure provide methods operational on a base station and/or base station including means for performing such methods. In one or more examples, such methods may include transmitting downlink transmissions over a plurality of remote antenna units, where at least two remote antenna units are employed for simulcasting downlink transmissions as a simulcasting group. One or more network traffic parameters may be obtained. In response to the one or more network traffic parameters, the simulcasting group may be modified to include at least one different remote antenna unit for simulcasting downlink transmissions.

Still further aspects of the present disclosure include machine-readable mediums comprising instructions operational on a base station. According to one or more examples, such instructions may cause a processor to transmit downlink transmissions over a plurality of remote antenna units, where at least two remote antenna units are employed for simulcasting downlink transmissions as a simulcasting group. The instructions may further cause the processor to obtain one or more network traffic parameters. In response to the one or more network traffic parameters, the instructions may cause the processor to modify the simulcasting group to include at least one different remote antenna unit for simulcasting downlink transmissions.

DETAILED DESCRIPTION

The following description set forth below in connection with the appended drawings is intended as a description of various configurations and is not intended to represent the only configurations in which the concepts described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form in order to avoid obscuring such concepts.

In the following description, certain terminology is used to describe certain features. For example, the term "base station" and "access terminal" are used herein, and are meant to be interpreted broadly. For example, a "base station" refers generally to a device that facilitates wireless connectivity (e.g., for one or more access terminals) to a communication or data network. A base station may be capable of interfacing with one or more remote antenna units. A base station may also be referred to by those skilled in the art as an access point, a base transceiver stations (BTS), a radio base station, a radio transceiver, a transceiver function, a basic service set (BSS), an extended service set (ESS), a Node B, an eNode B, a femto cell, a pico cell, or some other suitable terminology.

An "access terminal" refers generally to one or more devices that communicate with one or more other devices through wireless signals. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) enabled devices, and/or other communication/computing devices which communicate, at least partially, through a wireless or cellular network.

Figure 1:
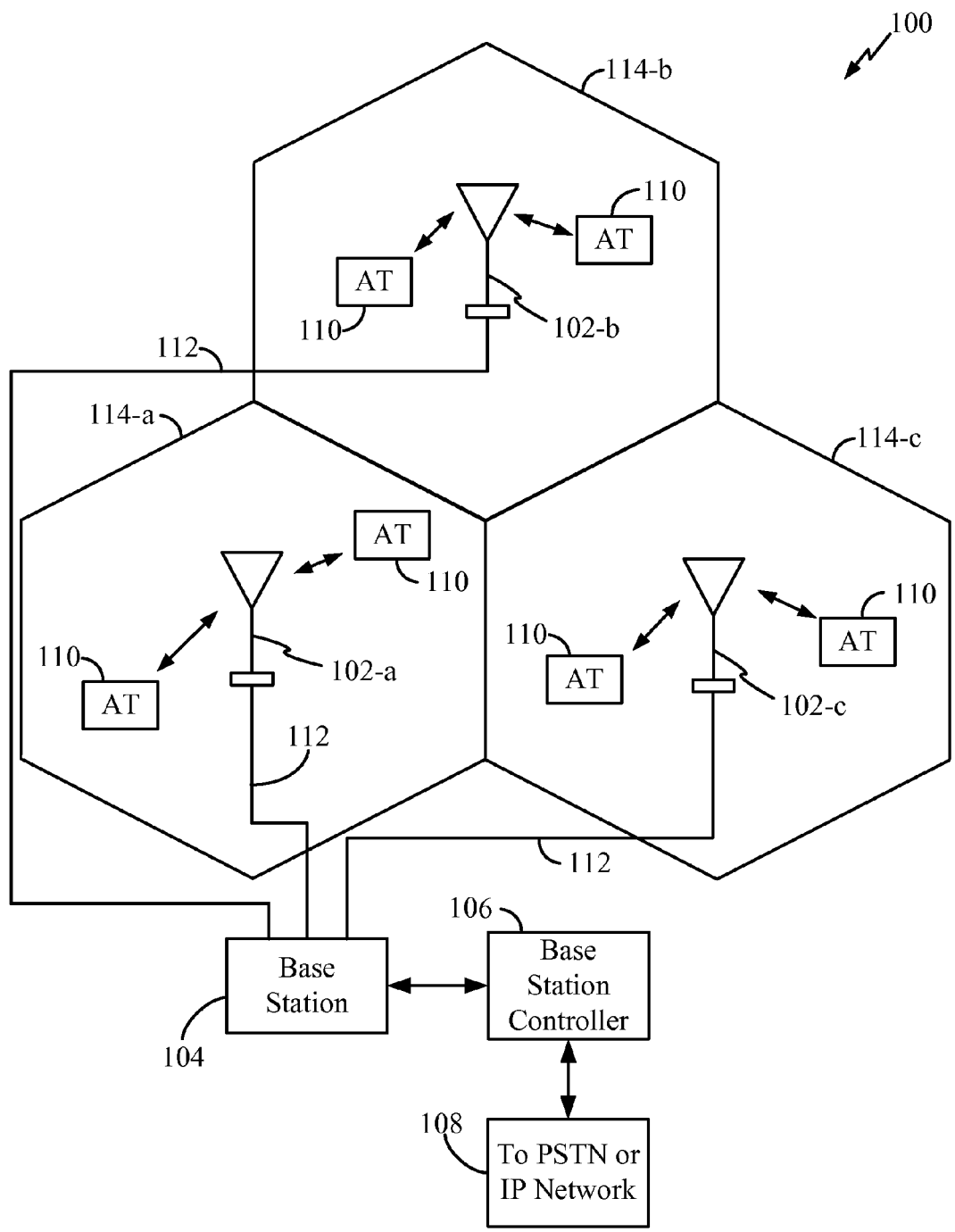
FIG. 1 is a block diagram illustrating a network environment according to at least one example in which one or more aspects of the present disclosure may find application.

FIG. 1 is a block diagram illustrating a network environment in which one or more aspects of the present disclosure may find application. The wireless communication system 100 is implemented with a distributed antenna system (DAS) architecture and may be configured according to one or more conventional telecommunication system, network architecture, and/or communication standard. By way of example and not limitation, the wireless communication system 100 may be configured according to one or more of Evolution Data Optimized (EV-DO), Universal Mobile Telecommunication Systems (UMTS), Long Term Evolution (LTE) (in FDD, TDD, or both modes), LTE-Advanced (LTE-A) (in FDD, TDD, or both modes), CDMA2000, Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication system, network architecture, and/or communication standard employed will depend on the specific application and the overall design constraints imposed on the system 100.

The wireless communication system 100 generally includes a plurality of remote antenna units (RAUs) 102, one or more base stations 104, a base station controller (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 can support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The remote antenna units 102, which are identified as 102-a, 102-b and 102-c, are adapted to wirelessly communicate with one or more access terminals 110. As illustrated, each of the remote antenna units 102-a, 102-b, 102-c are spatially separated from each other and are connected to a common base station 104 via a transport medium 112. The transport medium 112 may include a fiber cable and/or an optical cable in various examples. Accordingly, the base station 104 can actively distribute signals to the plurality of remote antenna units 102-a, 102-b, 102-c for communicating with the one or more access terminals 110.

The base station 104 can be configured to communicate with the access terminals 110 by means of the remote antenna units 102-a, 102-b, 102-c and under the control of the base station controller 106 via a plurality of carriers. The base station 104 can provide communication coverage for a respective geographic area, referred to herein as a cell. The cell can be divided into sectors 114 formed by the respective coverage area of each remote antenna unit 102-a, 102-b, 102-c, as shown by corresponding sectors 114-a, 114-b and 114-c.

In at least some examples, a base station 104 can be adapted to employ two or more of the remote antenna units 102-a, 102-b, 102-c to transmit essentially the same signal, potentially to be received at a single access terminal 110. This type of transmission is typically referred to as simulcasting. For example, the base station 104 may transmit a downlink signal from the two remote antenna units 102-a and 102-b. Simulcasting can improve the signal to interference and noise ratio (SINR) at the receiving access terminal 110, since the signal from each remote antenna unit 102-a, 102-b ideally adds together constructively at the receiving access terminal 110. Additionally, it is less likely that all the simulcasted transmissions will be blocked due to geography or fading than it might be for a transmission from a single remote antenna unit 102. In the case where remote antenna units 102-a and 102-b simulcast a downlink signal, the two areas depicted by sectors 114-*a* and 114-*b* can become a single sector and may employ a single sector identity (e.g., a single pseudo-random noise (PN) code).

The base station 104 can also be adapted to transmit different signals from different remote antenna units 102-*a*, 102-*b*, 102-*c*. This type of transmission is typically referred to as de-simulcasting. For example, the base station 104 may be adapted to transmit a different downlink signal from the remote antenna unit 102-*c*. De-simulcasting can be performed using the same carrier frequency as the one used by the other remote antenna units 102-*a*, 102-*b*, or using a different carrier frequency. De-simulcasting can improve the capacity of the wireless communication system 100 by increasing the data rate per unit area. That is, when each remote antenna unit 102-*a*, 102-*b*, 102-*c* serving a particular geographic area is transmitting a different signal, a greater number of access terminals 110 may be served by the system 100. In the case where a remote antenna unit 102-*a*, 102-*b*, 102-*c* is adapted to de-simulcast downlink signals, each area 114-*a*, 114-*b*, 114-*c* employs an individual and separate sector ID.

Figure 2:
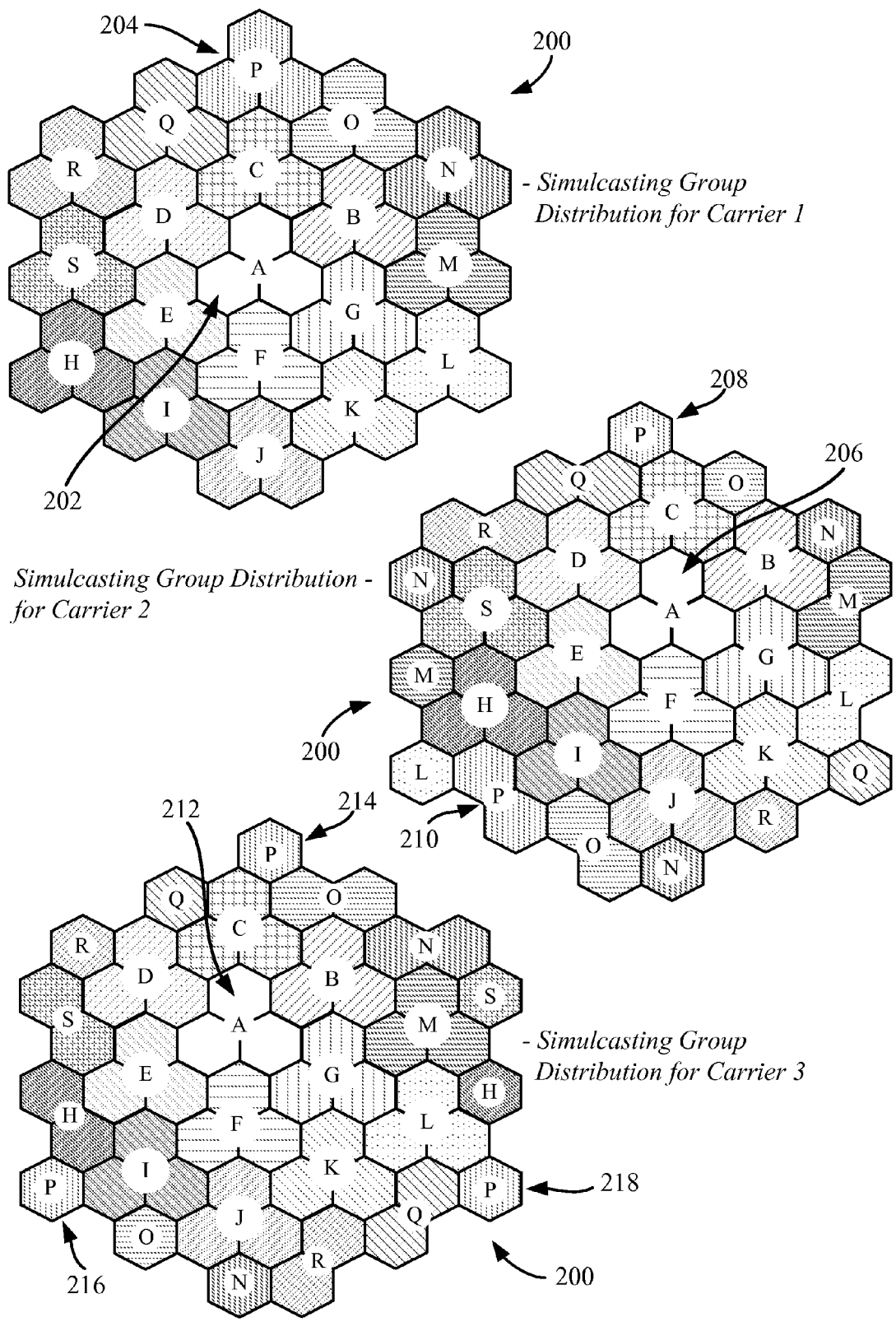
FIG. 2 is a block diagram illustrating at least one example of staggered simulcasting distributions in a distributed antenna system where each of three different carriers is configured with a different simulcasting distribution.

As noted above, a plurality of remote antenna units can be adapted to simulcast downlink transmissions, where each group of simulcasting remote antenna units forms a sector. As used herein, a plurality of simulcasting remote antenna units can form a sector by employing a common sector identity, such as a common pseudo-random noise (PN) code. FIG. 2 is a block diagram illustrating a coverage area 200 including a plurality of remote antenna units (such as the remote antenna units 102-*a*, 102-*b*, 102-*c* of FIG. 1) acting in groups to simulcast downlink transmissions. As depicted, each hexagon represents a coverage area associated with one remote antenna unit for transmitting and receiving radio signals. In addition, each remote antenna unit (i.e., each hexagon) is associated with one or more other remote antenna units (i.e., one or more other hexagons) forming a group for simulcasting downlink transmissions. Each simulcasting group of two or more remote antenna units can employ a common sector ID to form a single sector. In the examples depicted by FIG. 2, the coverage area 200 is configured with nineteen (19) different simulcasting groups (e.g., sectors A through S each depicted with unique hatch patterns), where each simulcasting group includes three (3) remote antenna units.

According to a feature of the present disclosure, the coverage area 200 can be configured to employ different simulcasting group configurations for each of a plurality of different carriers (e.g., different waveform signals of different frequencies). In other words, the remote antenna units employed for simulcasting downlink transmissions with a particular sector ID for a first carrier can differ from the remote antenna units employed for simulcasting downlink transmissions with the same sector ID for a second carrier. This feature can be further understood by reference to the non-limiting example depicted by the three different diagrams shown in FIG. 2.

The top diagram in FIG. 2 shows the simulcasting group distribution for a first carrier in the coverage area 200. As illustrated, the remote antenna units are grouped into nineteen (19) different simulcasting groups, where each group employs a different sector ID (e.g., sector IDs A-S). Each group includes three (3) different remote antenna units, and simulcasts downlink transmissions for the first carrier using a common sector ID. For example, the remote antenna units forming the group adapted to simulcast downlink transmissions with the sector ID 'A' for the first carrier are shown to include the middle three (3) remote antenna units depicted without any hatch pattern and indicated by arrow 202. Similarly, the remote antenna units forming the group adapted to simulcast downlink transmission with the sector ID 'P' for the first carrier are shown to include the three (3) remote antenna units located at the top and middle of the coverage area 200, and are depicted with a hatch pattern of vertical lines and indicated by arrow 204.

In the middle diagram of FIG. 2, the simulcasting group distribution for a second carrier is shown for the same coverage area 200. In this example, the same nineteen (19) different sector IDs are employed (e.g., sector IDs A-S). However, for the second carrier, each simulcasting group (e.g., each sector ID) employs a different group of three (3) remote antenna units for simulcasting downlink transmissions. For instance, in the example depicted by FIG. 2, the remote antenna units forming the group adapted to simulcast downlink transmissions with the sector ID 'A' (indicated by arrow 206) for the second carrier are shown to include two (2) remote antenna units that differ from the remote antenna units employed for simulcasting with the same sector ID 'A' for the first carrier. In this example, each of the simulcasting groups is shifted up and to the right.

For some simulcasting groups with the second carrier, the remote antenna units are separated so that the three (3) remote antenna units of a simulcasting group are no longer adjacent to one another like they were for the first carrier. For instance, the group of remote antenna units employed for simulcasting downlink transmissions with the sector ID 'P' for the second carrier are shown to include one (1) remote antenna unit 208 at the top and middle of the coverage area 200, and two (2) other remote antenna units 210 at the bottom left side of the coverage area 200.

The bottom diagram of FIG. 2 illustrates the simulcasting group distribution for a third carrier for the same coverage area 200. In this example, the same nineteen (19) different sector IDs are employed (e.g., sector IDs A-S). However, for the third carrier, each simulcasting group (e.g., each sector ID) employs yet another different group of three (3) remote antenna units for simulcasting downlink transmissions. For instance, in the example depicted by FIG. 2, the remote antenna units forming the group adapted to simulcast downlink transmissions with the sector ID 'A' (indicated by arrow 212) for the third carrier are shown to include two (2) remote antenna units that differ from the remote antenna units employed for simulcasting with the same sector ID for the first or second carriers. In this example, each of the simulcasting groups is shifted up and to the left.

As with the middle diagram, the bottom diagram includes some simulcasting groups including remote antenna units that are spatially separated and no longer adjacent to one another. For example, the group of remote antenna units employed for simulcasting downlink transmissions with the sector ID 'P' for the third carrier are shown to include one (1) remote antenna unit 214 at the top and center of the coverage area 200, one (1) remote antenna unit 216 at the lower left side of the coverage area 200, and one (1) remote antenna unit 218 at the lower right side of the coverage area 200.

In the illustrated example, where the simulcasting configurations have a 3:1 ratio (i.e., three (3) remote antenna units to one (1) sector), a significant improvement in the signal to interference and noise ratio (SINR) can be achieved by providing different simulcasting group distributions for different carriers. For instance, a conventional distributed antenna system (DAS) would employ only one of the three simulcasting group distribution configurations of FIG. 2 for all three carriers. That is, a conventional distributed antenna system (DAS) would typically use either the top, middle or bottom configuration for all three carriers, and would achieve some improvement to signal to interference and noise ratio (SINR) for access terminals distributed through the coverage area 200. By comparison, employing the simulcasting architecture where a different simulcasting group distribution is employed for each carrier according to the configurations described above, the signal to interference and noise ratio (SINR) can be further improved. By way of example and not limitation, a four (4) dB improvement was determined in the described configurations in the 10% tail for single-carrier access terminals which are uniformly dropped over the geography, when they are assigned to the carrier which has the best simulcasting pattern for the particular location of the access terminal.

In addition, an overall gain in network throughput can also be obtained by employing the three different simulcasting group distributions of FIG. 2 as compared to employing the same simulcasting group distribution for all carriers. In the described configurations, more time can be allocated on the simulcasting distribution which is best for each user, resulting in an overall gain in the network throughput as well as an increase in the 10% tail throughput. By way of example and not limitation, an increase in the overall network throughput as well as an increase in the 10% tail throughput of 27% was determined in the particular example shown in FIG. 2. However, smaller or larger throughput gains may be possible, depending on the specific deployment model implemented.

It is noted that the number of carriers and the simulcasting distribution configurations described above with reference to FIG. 2 are only examples, and that other configurations and other numbers of carriers may be employed according to various implementations of the underlying features.

Figure 3:
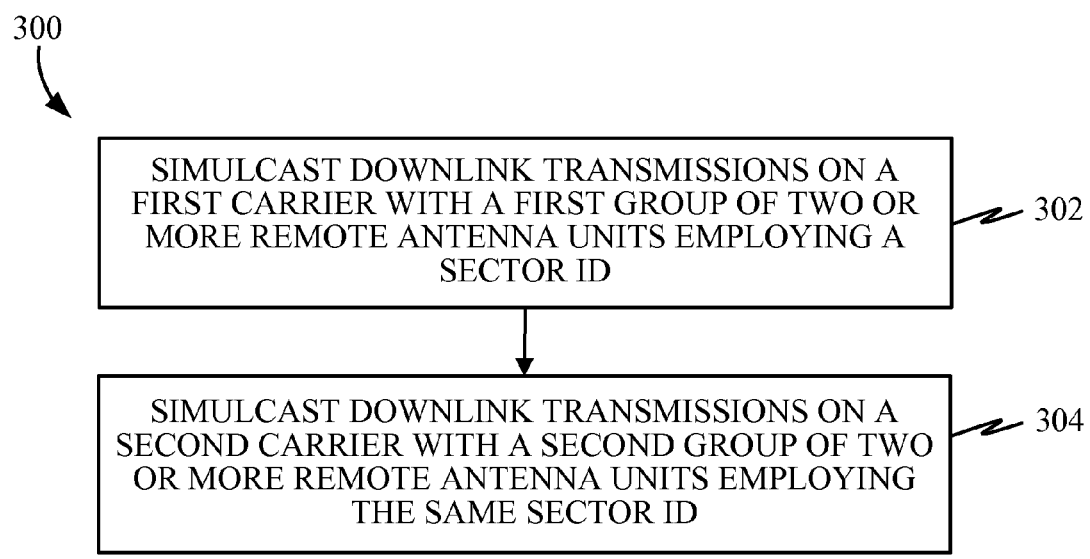
FIG. 3 is a flow diagram illustrating at least one example of a method for wireless communication.

At least one aspect of the present disclosure includes methods for wireless communication. FIG. 3 is a flow diagram illustrating at least one example of a method 300 for wireless communication associated with the features described above with reference to FIG. 2. The method 300 includes simulcasting downlink transmissions on a first carrier with a first group of two or more remote antenna units employing a common sector ID at step 302. At step 304, downlink transmissions are simulcast on a second carrier with a second group of two or more remote antenna units employing the same sector ID. At least one remote antenna unit of the second group differs from the remote antenna units making up the first group.

For example, the group 202 in FIG. 2 may be a first group of remote antenna units simulcasting downlink transmissions with the sector ID 'A' on the first carrier, and the group 206 may be the second group of remote antenna units simulcasting downlink transmission with the same sector ID 'A' on the second carrier. In the example, the remote antenna units making up the group 202 are different from the remote antenna units making up the group 206. That is, two of the remote antenna units of the second group 206 are different remote antenna units from the remote antenna units making up the first group 202. In this non-limiting example, one of the remote antenna units in the first group 202 is also included as a remote antenna unit of the second group 206.

Figure 4:
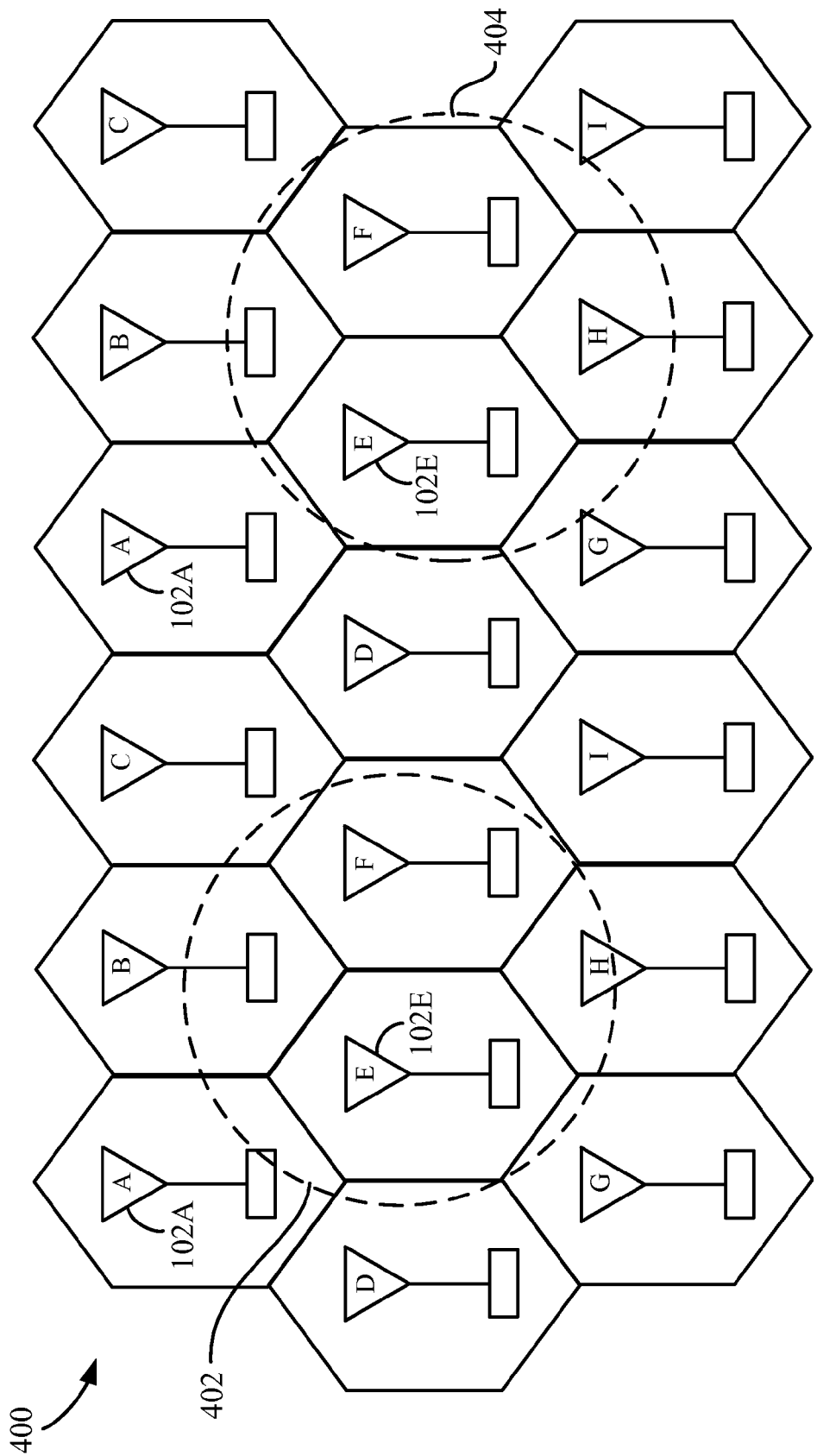
FIG. 4 is a block diagram illustrating at least one example of a distributed antenna system architecture employable in a geographic area in which a population mass moves at least substantially as a group.

At least some features of the present disclosure relate to increasing efficiency by strategically distributing resources in a coverage area. Typically, strategies for increasing the spectral efficiency for a particular area have included increasing the number of base station sectors in that area by an increase in the number of base stations, which base stations can be fairly expensive. In some instances, however, all locations within the particular coverage area may not need increased spectral efficiency at the same time. It has been determined that masses of people may tend to move together, so that increased spectral efficiency would be beneficial at only one portion of a given area for each moment in time. For example, FIG. 4 is a block diagram illustrating a geographic coverage area 400 where a majority of the population may be found in and around the area 402 during one part of each day and/or week, and in and around the area 404 during another part of each day and/or week. For instance, a majority of the population within the coverage area 400 may move into the area 402 in the mornings as the population goes to work, and then may be found generally in the area 404 in the evenings as the population returns to their homes.

According to a feature, simulcasting distribution configurations may be implemented for increased efficiency in distributing resources within a coverage area. For instance, a simulcasting distribution configuration may be implemented in a manner to increase spectral efficiency by increasing the number of sectors in a given part of the coverage area, without increasing the number of base stations.

Referring still to FIG. 4, a plurality of remote antenna units 102 are spatially distributed throughout the coverage area 400. In the illustrated example, simulcasting groups are formed with remote antenna units that are geographically separated such that the respective coverage areas of the remote antenna units forming a simulcasting group are generally not adjacent to one another. In general, the geographic separation between simulcasting remote antenna units may be such that an access terminal communicating with at least one remote antenna unit of a simulcasting group is not able communicate with at least one other remote antenna unit of the same simulcasting group at any given time.

Each simulcasting group is depicted in FIG. 4 with a letter indicating a sector ID with which the remote antenna units are configured to simulcast downlink transmissions. For example, the two remote antenna units 102A are depicted with the letter 'A' to indicate that these two remote antenna units are adapted to simulcast transmissions using the same sector ID 'A'. Similarly, the two remote antenna units 102E are depicted with the letter 'E' to indicate that these two remote antenna units simulcast transmissions using the same sector ID 'E'. As shown, the two remote antenna units 102A are geographically separated such that the respective coverage areas of each remote antenna unit 102A are not adjacent. The two remote antenna units 102E are likewise geographically separated. Similar simulcasting pairs are also shown for sector IDs 'B' through 'D' and 'F' through 'I', with the remote antenna units for each pair being geographically separated from one another.

In the illustrated example, wherever there is a mass of users concentrated in a given area (e.g., 402 or 404), those users are served by multiple sectors. For instance, when a large majority of the population is found in and around the area 402 (e.g., in the morning), they will be served generally by all of the sectors 'A'-'I'. When the majority of the population moves to an area in and around the area 404 (e.g., in the evening), they will be served generally by the same number of sectors 'A'-'I'. As the population moves throughout the network in a large majority, there is a low probability all remote antenna units will experience large throughput demands. Therefore, with the simulcasting pattern shown in FIG. 4, the population mass will typically be served by eight (8) or nine (9) different sectors as the population moves at least substantially together throughout the network. This is about twice as many sectors as would be available in a typical configuration where simulcasting remote antenna units would be geographically adjacent to one another. In addition, the number of sectors per area is increased without increasing the number of base stations serving that area. Furthermore, if the same population becomes less concentrated and spreads more evenly throughout the coverage area 400, the sectors 'A'-'I' employed for serving the entire coverage area 400 across the distributed simulcasting pattern of remote antenna units 102 is still sufficient to meet the population's demand.

It is noted that in some implementations not all the remote antenna units within a particular coverage area 400 may be adapted to simulcast. Instead, there may be a combination of simulcasting remote antenna units and de-simulcasting remote antenna units, according to numerous possible configurations.

Figure 5:
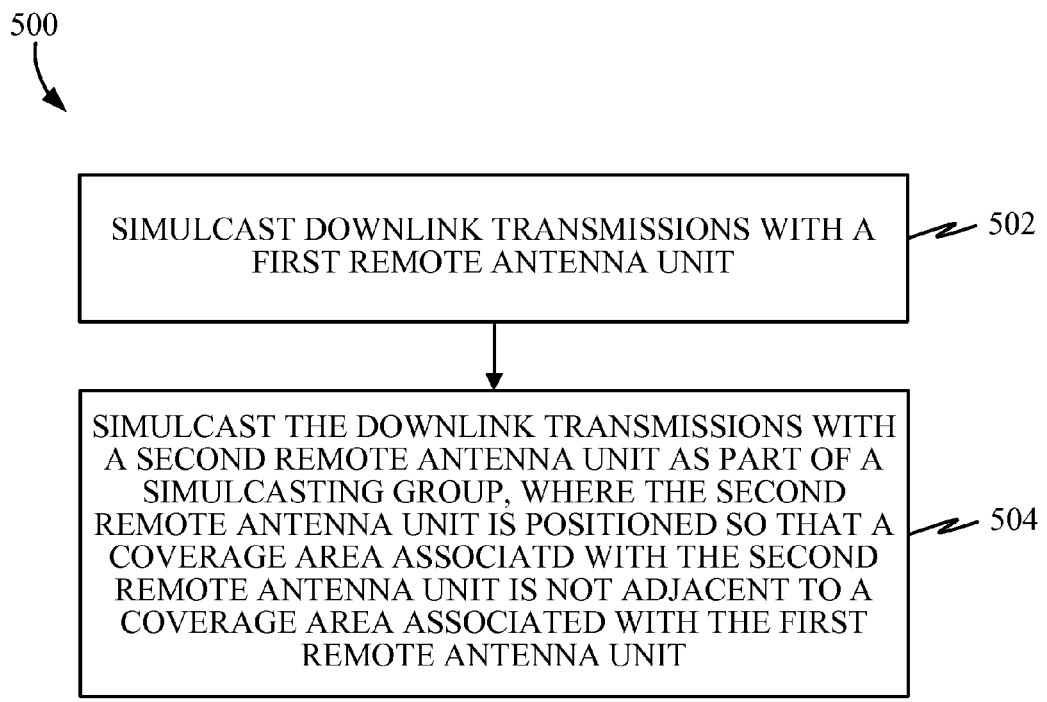
FIG. 5 is a flow diagram illustrating at least one example of a method for wireless communication.

At least one aspect of the present disclosure includes methods for wireless communication. FIG. 5 is a flow diagram illustrating at least one example of a method 500 for wireless communication associated with the features described above with reference to FIG. 4. The method 500 includes simulcasting downlink transmissions with a first remote antenna unit at step 502. At step 504, the downlink transmissions are also simulcast with a second remote antenna unit, such that the first remote antenna unit and the second remote antenna unit form a simulcasting group. The second remote antenna unit is located so that a coverage area associated with the second remote antenna unit is not adjacent to a coverage area associated with the first remote antenna unit.

For example, the plurality of remote antenna units identified by reference number 102A in FIG. 4 may simulcast downlink transmissions. As depicted, the coverage area (depicted by each respective hexagon) of the two remote antenna units 102A are not adjacent to each other.

According to at least one feature, the simulcasting distribution configurations and associated methods for wireless communications described above with reference to FIGS. 2-5 may be dynamically configured. In some instances, the network (e.g., a base station, a base station controller, etc.) can measure one or more parameters (e.g., the interference, traffic demand statistics, etc.) and determine how to arrange the simulcasting group configurations across the geography and across carriers to increase stability and throughput to each user, as well as to the network as a whole. For example, at least one remote antenna unit in a simulcasting group can be changed in response to one or more network traffic parameters. That is, one or more remote antenna units can be added to and/or removed from a simulcasting group in response to at least one network traffic parameter.

For instance, it may occur that access terminals operating within a coverage area are not dispersed uniformly through the area. For example, it may be determined by the network that access terminals in a specific region are especially active at a particular time along one or more handoff boundaries (e.g., along a region between simulcasting groups 'C' and 'P' in the top diagram of FIG. 2). In such an instance, it may be beneficial to dynamically change the simulcasting group distributions. For example, the simulcasting group distributions may be dynamically modified by the network to employ a simulcasting group distribution that optimizes the throughput and capacity for those access terminals. In the example from FIG. 2, for instance, it may be beneficial to dynamically change the group distributions so that two of the carriers or even all three carriers employ the same simulcasting group distribution determined to optimize the throughput and capacity for those access terminals located along the one or more handoff boundaries indicated above. That is, the network may change at least one remote antenna unit in any of the different groups for any of the different carrier configurations. When the network dynamics return to a more uniformly dispersed access terminal distribution, the simulcasting distribution configuration can return to the three configurations depicted in FIG. 2, or some other configurations.

In the example of FIG. 4, the network may be adapted to identify the movement of the mobile population and responsively adapt the simulcasting group configurations to accommodate the population mass. For instance, the network may identify a large concentration of access terminals in a particular area. For example, there may be a sporting contest, concert, or other spectacle scheduled at a specific venue, causing the population to move generally together as a group and concentrate in and around that venue. The network may identify this movement in the population and may deploy a simulcasting group configuration similar to the configuration depicted by FIG. 4 in order to increase a number of sectors available for the area around the venue in order to improve network performance for the concentrated population. That is, the network can change which remote antenna units simulcast by, for example, adding one or more remote antenna units to and/or removing one or more remote antenna units from a simulcasting group in response to at least one network traffic parameter.

Figure 6:
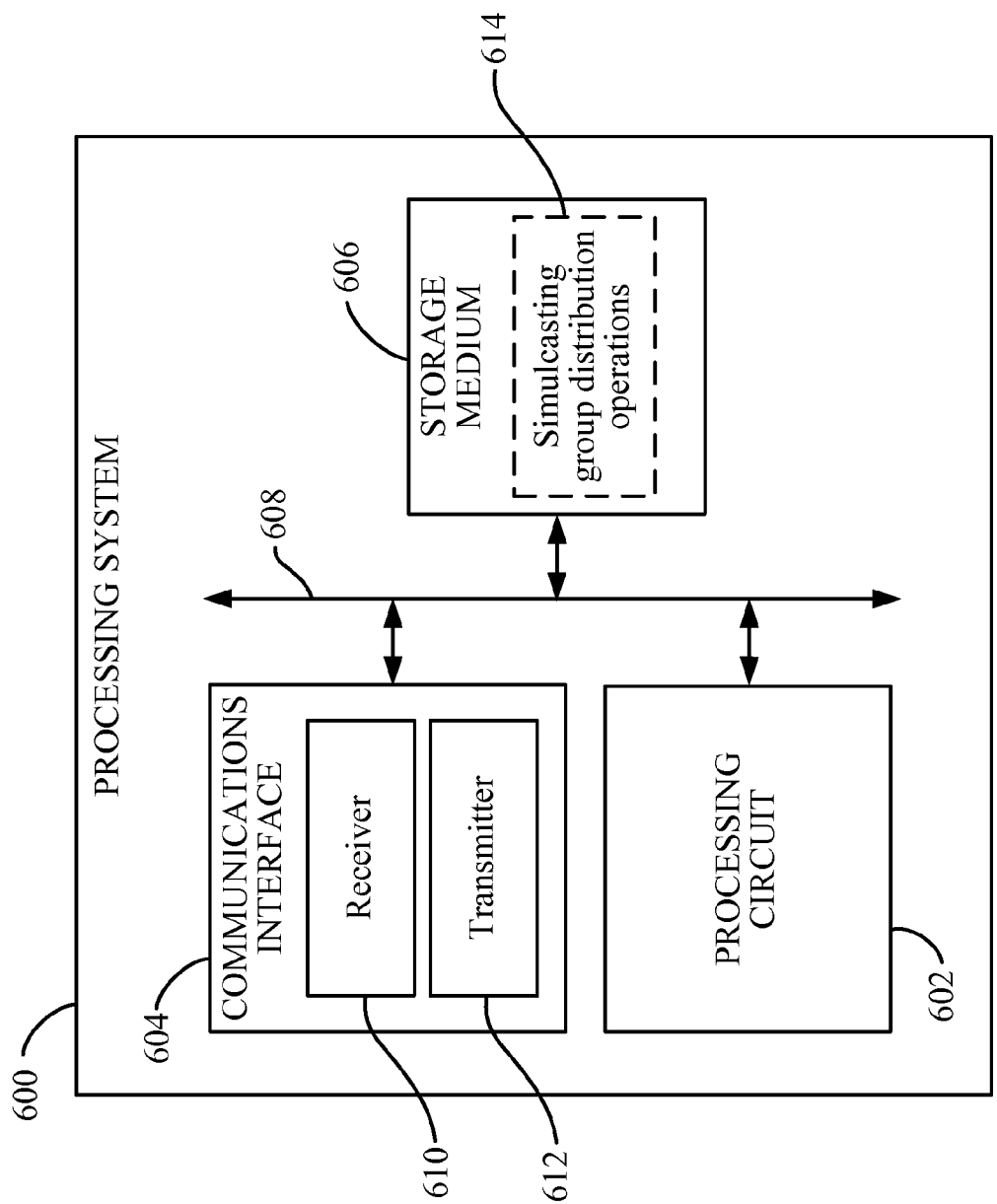
FIG. 6 is a block diagram illustrating select components of a network entity according to at least one example.

The various features, simulcasting configurations and methods for wireless communication described above can be implemented by one or more network entities. Such one or more network entities may be generally implemented with one or more processing systems. FIG. 6 is a block diagram illustrating select components of a processing system 600 according to at least one example. The processing system 600 may generally include a processing circuit 602 coupled to a communications interface 604 and to a storage medium 606. In at least some examples, the processing circuit 602 may be coupled to the communications interface 604 and the storage medium 606 with a bus architecture, represented generally by the bus 608. The bus 608 may also link various other circuits such as timing sources, peripherals, voltage regulators, and power management circuits, which are well known in the art, and therefore, will not be described any further.

The processing circuit 602 is arranged to obtain, process, and/or send data, control data access and storage, issue commands, and control other desired operations. The processing circuit 602 may include circuitry configured to implement desired programming provided by appropriate media in at least one embodiment. For example, the processing circuit 602 may be implemented as one or more of a processor, a controller, a plurality of processors and/or other structure configured to execute executable instructions including, for example, software and/or firmware instructions, and/or hardware circuitry. Examples of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 602 are for illustration and other suitable configurations within the scope of the present disclosure are also contemplated.

The processing circuit 602 is adapted for processing, including the execution of programming, which may be stored on the storage medium 606. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 604 is configured to facilitate wired and/or wireless communications of the processing system 600. For example, the communications interface 604 may include circuitry and/or programming adapted to facilitate the communication of information bi-directionally with respect to one or more other processing systems. In instances where the communications interface 604 is configured to facilitate wireless communications, the communications interface 604 may be coupled to one or more antennas (not shown), and may includes wireless transceiver circuitry, including at least one receiver circuit 610 (e.g., one or more receiver chains) and/or at least one transmitter circuit 612 (e.g., one or more transmitter chains).

The storage medium 606 may represent one or more devices for storing programming and/or data, such as processor executable code or instructions (e.g., software, firmware), electronic data, databases, or other digital information. The storage medium 606 may also be used for storing data that is manipulated by the processing circuit 602 when executing programming. The storage medium 606 may be any available media that can be accessed by a general purpose or special purpose processor. By way of example and not limitation, the storage medium 606 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof. The storage medium 606 may be coupled to, or at least accessible by the processing circuit 602 such that the processing circuit 602 can read information from, and write information to, the storage medium 606. For instance, the storage medium 606 may be resident in the processing system 600, external to the processing system 600, or distributed across multiple entities including the processing system 600. In some examples, the storage medium 606 may be integral to the processing circuit 602.

Programming stored by the storage medium 606, when executed by the processing circuit 602, causes the processing circuit 602 to perform one or more of the various functions and/or process steps described herein. The storage medium 606 may include simulcasting group distribution operations (i.e., instructions) 614. The simulcasting group distribution operations 614 can be implemented by the processing circuit 602. Thus, according to one or more aspects of the present disclosure, the processing circuit 602 may be adapted to perform any or all of the processes, functions, steps and/or routines for any or all of the network entities (e.g., base station 104, 702, 1102; base station controller 106, 708, 1106; RF connection matrix 704; base station simulcast controller module 1114, 1402 etc.) described herein. As used herein, the term "adapted" in relation to the processing circuit 602 may refer to the processing circuit 602 being one or more of configured, employed, implemented, or programmed to perform a particular process, function, step and/or routine according to various features described herein.

Figure 7:
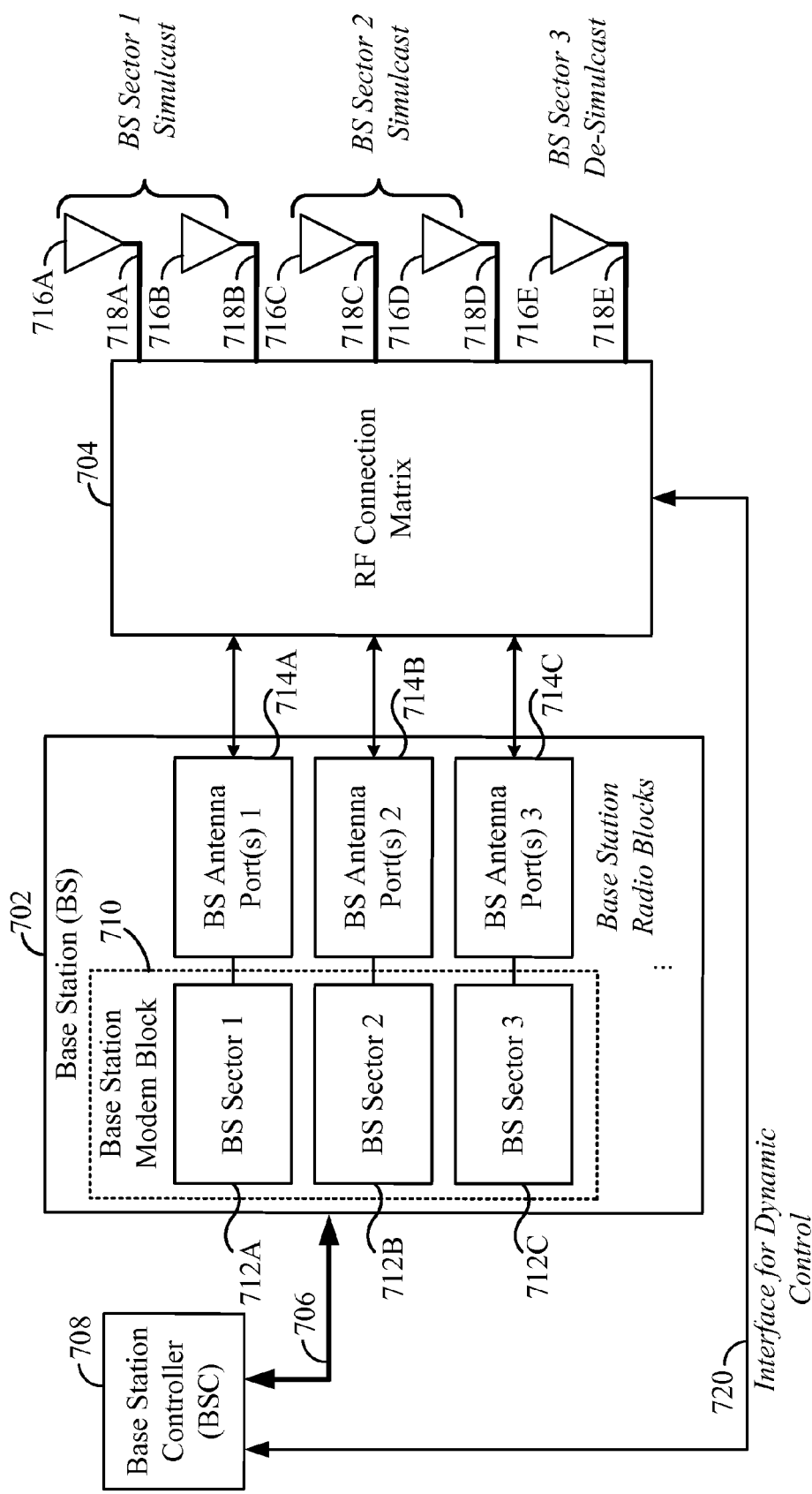
FIG. 7 is a simplified block diagram illustrating select components of at least one example of a base station adapted to operate in conjunction with an RF connection matrix for implementing one or more of the features described herein for a distributed antenna system (DAS).

In at least one example, a processing system 600 may be implemented as an RF connection matrix, which may also be referred to as a "head end", and/or as a base station coupled with such an RF connection matrix. Such a processing system 600 can be adapted to facilitate simulcasting according to one or more of the features described herein, such as those described above with reference to FIGS. 2-5. FIG. 7 is a simplified block diagram illustrating select components of a base station 702 adapted to operate in conjunction with an RF connection matrix 704 for implementing one or more of the features described herein for a distributed antenna system (DAS).

As shown, a base station (BS) 702 is utilized to enable multiple access wireless communication. The base station 702 includes a backhaul interface 706 for backhaul communication with a base station controller (BSC) 708. Further, the base station 702 includes a base station modem block 710 including a plurality of base station sector controllers 712A, 712B, and 712C, and a corresponding plurality of base station antenna ports 714A, 714B, and 714C. Within the base station modem block 710, the respective base station sector controllers 712A, 712B, and 712C each include circuitry for transmitting a downlink and receiving an uplink for one sector or cell in the wireless communication system. In one example, all of the base station sector controllers 712A, 712B, and 712C may reside on the same channel card. In another example, they may be on different channel cards. The base station antenna ports 714A, 714B, and 714C are each coupled to an RF connection matrix 704.

In this example, the RF connection matrix 704 determines how the outgoing signals are routed from the base station 702 to a plurality of remote antenna units 716 for downlink transmission. Typically, the coupling between the base station antenna ports 714 and the RF connection matrix 704 is made by way of respective RF electrical communication interfaces. The RF connection matrix 704 is coupled to a plurality of remote antenna units 716 (e.g., 716A, 716B, 716C, 716D, and 716E). In at least some implementations, the coupling between the RF connection matrix 704 and the remote antenna units 716 includes respective transport medium interfaces 718A, 718B, 718C, 718D, and 718E. Each of the base station antenna ports 714A, 714B, 714C may include one or more antenna ports to facilitate coupling a respective base station sector with one remote antenna unit 716 or with a plurality of remote antenna units 716.

The distributed antenna system (DAS) illustrated in FIG. 7 may be utilized for simulcasting and de-simulcasting any of a plurality of configurations including configurations according to the general principles described above. For example, the remote antenna units 716A and 716B may be simulcast, the remote antenna units 716C and 716D may be simulcast, and the remote antenna unit 716E may be de-simulcast. Furthermore, the depicted grouping can be implemented for one carrier, while other carriers may employ different grouping configurations.

Figure 8:
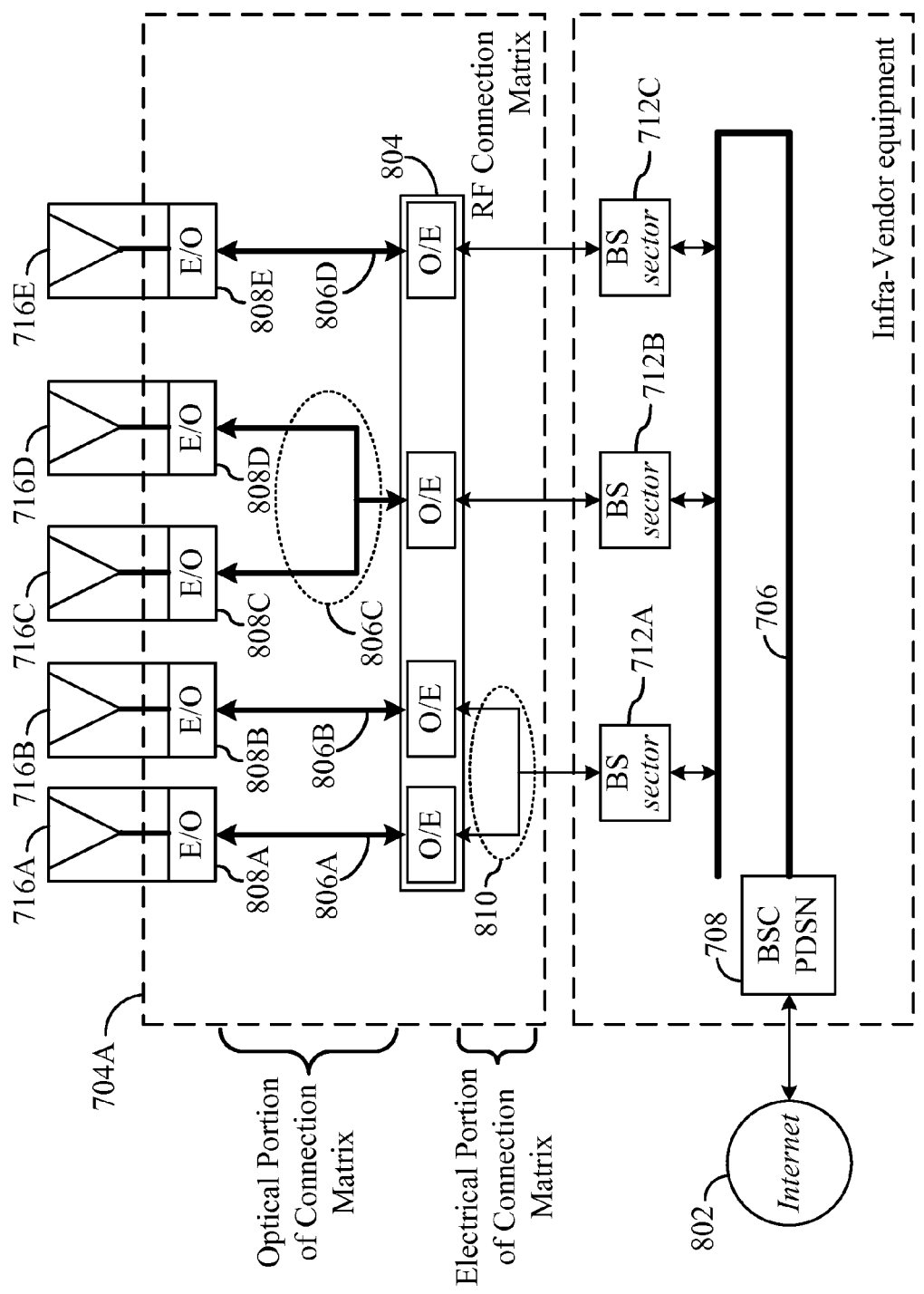
FIG. 8 is a block diagram illustrating select details relating to at least one example of the RF connection matrix of FIG. 7.
Figure 9:
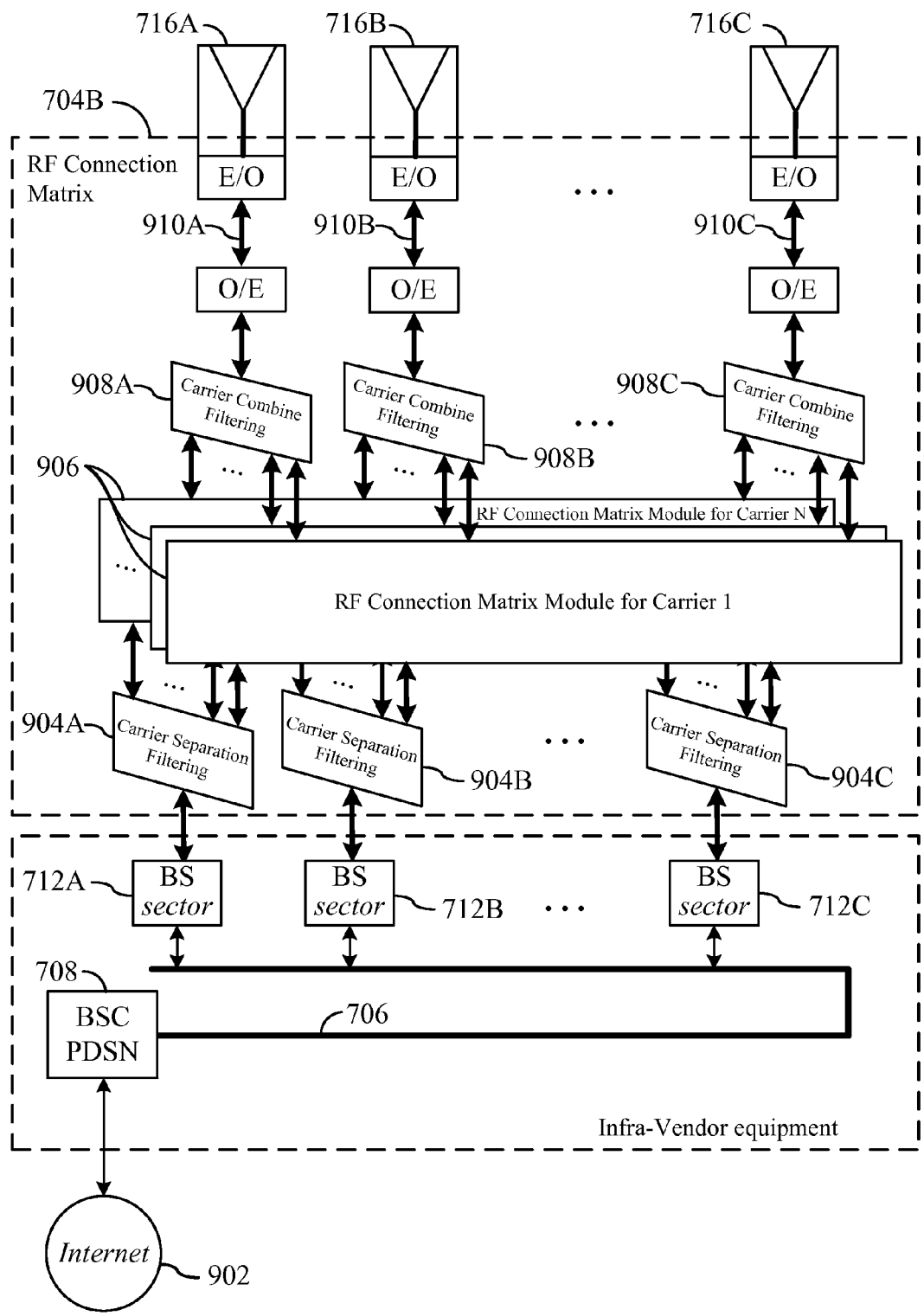
FIG. 9 is a block diagram illustrating select details relating to at least one other example of an RF connection matrix of FIG. 7.

The RF connection matrix 704 may employ various configurations, such as one of the configurations depicted in FIGS. 8 and 9. Referring initially to FIG. 8, a block diagram is shown illustrating select details relating to at least one example of an RF connection matrix. The example depicted in FIG. 8 can be employed for various simulcasting configurations where a plurality of remote antenna units 716 are employed for simulcasting downlink transmissions. By way of example and not limitation, the RF connection matrix 704A may be employed for implementing one or more of the features described herein with reference to FIG. 4.

In FIG. 8, the three base station sector controllers 712A, 712B, and 712C are shown. Here, the base station sector controllers 712A, 712B, and 712C are coupled, by way of a backhaul connection 706, to the base station controller 708. Further, the base station controller 708 is coupled to a network such as the Internet 802. Although the base station antenna ports 714 are not illustrated in FIG. 8, the interface between the base station sector controllers 712A, 712B, and 712C and the RF connection matrix 704A is assumed to include such antenna ports.

The RF connection matrix 704A is provisioned to route the outgoing signals from the base station sectors 712A, 712B, 712C to the remote antenna units 716 for downlink transmission. Here, the RF connection matrix 704A includes an electrical portion where electrical RF signals output by the base station sectors 712 are provided to a central hub 804 having optical-electrical interfaces (O/E) for coupling the electrical RF signals with optical fibers 806 for transmission to the remote antenna units 716 as optical signals in an optical portion. The optical signals are then converted back to electrical signals at electrical-optical interfaces (E/O) 808 for interfacing directly with antennas. Here, the E/O and various active elements are illustrated at the remote antenna units 716. However, in various examples all or some portion of these components may be located outside the remote antenna units 716.

In the illustrated example, the RF connection matrix 704A is provisioned to simulcast the downlink signal from the first base station sector 712A from the first two remote antenna units 716A and 716B. As an example, simulcasting can be accomplished by way of RF combining in the electrical portion of the RF connection matrix 704A, as depicted at 810. That is, the electrical signal representing a downlink transmission sent from the first base station sector 712A is split and fed to two O/E interfaces at the central hub 804, so that corresponding optical signals are transmitted over the first and second fibers 806A and 806B to the first and second remote antenna units 716A and 716B to be simulcasted.

Further, the RF connection matrix 704A is provisioned to simulcast the downlink signal from the second base station sector 712B from the third and fourth remote antenna units 716C and 716D. As another example, simulcasting can be accomplished by way of fiber combining in the optical portion of the RF connection matrix 704A, as depicted at 806C. That is, the electrical signal representing a downlink transmission sent from the second base station sector 712B is fed into an O/E interface at the central hub 804, after which the corresponding optical signal is split from one to two fibers 806C, so that the corresponding optical signals are sent to the third and fourth remote antenna units 716C and 716D to be simulcasted.

Still further, the RF connection matrix 704A is provisioned to de-simulcast the downlink signal from the third base station sector 712C from the fifth remote antenna unit 716E. That is, the electrical signal representing a downlink transmission sent from the third base station sector 712C is fed into an O/E interface at the central hub 804, after which the corresponding optical signal is sent to the fifth remote antenna unit 716E to be transmitted.

Turning to FIG. 9, a block diagram is shown illustrating select details relating to at least one other example of an RF connection matrix. The example depicted in FIG. 9 can be employed for various simulcasting configurations where a plurality of remote antenna units 716 are employed for simulcasting downlink transmissions, as well as for implementing different simulcasting configurations among two or more different carriers. By way of example and not limitation, an RF connection matrix 704B depicted in FIG. 9 may be employed for implementing one or more of the features described above with reference to FIGS. 2 and 4.

In FIG. 9, the three base station sector controllers 712A, 712B, and 712C are once again depicted with the base station sector controllers 712A, 712B, and 712C coupled by way of a backhaul connection 706 to the base station controller 708. Further, the base station controller 708 is coupled to a network such as the Internet 902. Although the base station antenna ports 714 from FIG. 7 are not illustrated in FIG. 9, the interface between the base station sector controllers 712A, 712B, and 712C and the RF connection matrix 704B (e.g., the carrier separation filters 904) is assumed to include such base station antenna ports 714 in FIG. 7.

The RF connection matrix 704B is provisioned to route the outgoing signals from the base station sector controllers 712A, 712B, 712C to the remote antenna units 716 for downlink transmission. In the example of FIG. 9, the RF connection matrix 704B includes a plurality of carrier-specific RF connection matrix modules 906. Each of the respective carrier-specific RF connection matrix modules 906 can route the carrier-specific downlink transmissions to one or more remote antenna units 716 for transmission on the respective carrier.

The RF connection matrix 704B can include a carrier separation filter 904 coupled with the antenna ports for each base station sector controller 712. For instance, respective carrier separation filters 904A, 904B, and 904C are coupled with the base station sector controllers 712A, 712B, and 712C. Each of the carrier separation filters is further coupled with the plurality of carrier-specific RF connection matrix modules 906. The carrier separation filters 904 are adapted to receive one or more signals associated with a sector identity (ID), where the one or more signals include downlink transmissions for a plurality of carriers. For instance, a carrier separation filter 904 may receive one or more signals from one or more base station sector controllers 712. The carrier separation filters 904 then separate the downlink transmissions for each carrier and provide these downlink transmissions to a respective carrier-specific RF connection matrix module 906.

In some examples, the carrier-specific RF connection matrix modules 906 may provide the carrier-specific downlink transmissions to a carrier combine filter 908 associated with a respective remote antenna unit 716. For instance, the carrier combine filters 908A, 908B, and 908C are respectively associated with remote antenna units 716A, 716B, and 716C. The carrier combine filters 908 can receive from each of the carrier-specific RF connection matrix modules 906 the downlink transmissions intended for the associated remote antenna units 716, and can combine the various signals for transmission to respective remote antenna units 716.

Although there is an equal number of base station sector controllers 712 and remote antenna units 716, it will be apparent to a person of ordinary skill in the art that the number of remote antenna units 716 may be different from the number of base station sector controllers 712, and the specific number of base station sector controllers 712 and remote antenna units 716 can vary according various implementations.

By way of an example and not by way of limitation, the base station sector controller 712A may convey to the carrier separation filter 904A a signal including downlink transmissions for a first carrier (e.g., carrier 1) and for a second carrier (e.g., carrier 2). These downlink transmissions are associated with a common sector identity (ID) of the base station sector controller 712A. The carrier separation filter 904A filters the signal to convey the downlink transmission for the first carrier to the carrier-specific RF connection matrix module 906 for carrier 1 and the downlink transmission for the second carrier to the carrier-specific RF connection matrix module 906 for carrier 2.

Generally speaking, and by way of example only, the carrier separation filter 904A may receive a signal from the base station sector controller 712A that includes downlink transmissions for a first carrier and downlink transmissions for a second carrier. The carrier separation filter 904A may filter the downlink transmissions communicated to the carrier-specific RF connection matrix module 906 for carrier 1 to include only those downlink transmissions for the first carrier. Similarly, the carrier separation filter 904A may filter the downlink transmissions communicated to the carrier-specific RF connection matrix module 906 for carrier 2 to include only those downlink transmissions for the second carrier. Similar operations may occur in the other base station sector controllers 712B and 712C, and in the carrier separation filters 904B and 904C.

The carrier-specific RF connection matrix module 906 for carrier 1 can route received downlink transmissions to one or more remote antenna units 716 for transmission on the first carrier. Similarly, the carrier-specific RF connection matrix module 906 for carrier 2 can route received downlink transmissions to one or more remote antenna units 716 for transmission on the second carrier. Simulcasting can be accomplished by way of RF combining in the carrier-specific RF connection matrix modules 906 in a manner similar to the RF combining described above with reference to the electrical portion of the RF connection matrix 704A in FIG. 8.

With the downlink transmissions in the respective carrier-specific RF connection matrix modules 906 directed to their intended remote antenna units 716, the downlink transmission signals from a plurality of the carrier-specific RF connection matrix modules 906 can be combined for downlink transmissions in the carrier combine filters 908 associated with each respective remote antenna unit 716. The combined signals can be fed to the O/E interfaces so that corresponding optical signals are transmitted over the respective optical cables 910 to the antenna units 716 for de-simulcast and/or simulcast transmissions.

As depicted in FIG. 9, the RF connection matrix 704B can facilitate different simulcast grouping per carrier by decomposing multicarrier base station signals into separate per-carrier signals in the carrier separation filters 904, and employing carrier-specific RF connection matrix modules 906 for each carrier. Moreover, in addition to facilitating different simulcast groupings per carrier, the RF connection matrix 704B can also facilitate simulcasting on the downlink while using diversity antennas on the uplink. From a capacity standpoint, it can be beneficial to exploit available diversity on the uplink, and the presented RF connection matrix 704B can provide increased uplink capacity compared to conventional RF connection matrix configurations, which typically simulcast on the uplink. The separation of downlink and uplink multiplexing is not explicitly shown in FIG. 9, but will be readily understood from the diagram by a person of ordinary skill in the art.

Figure 10:
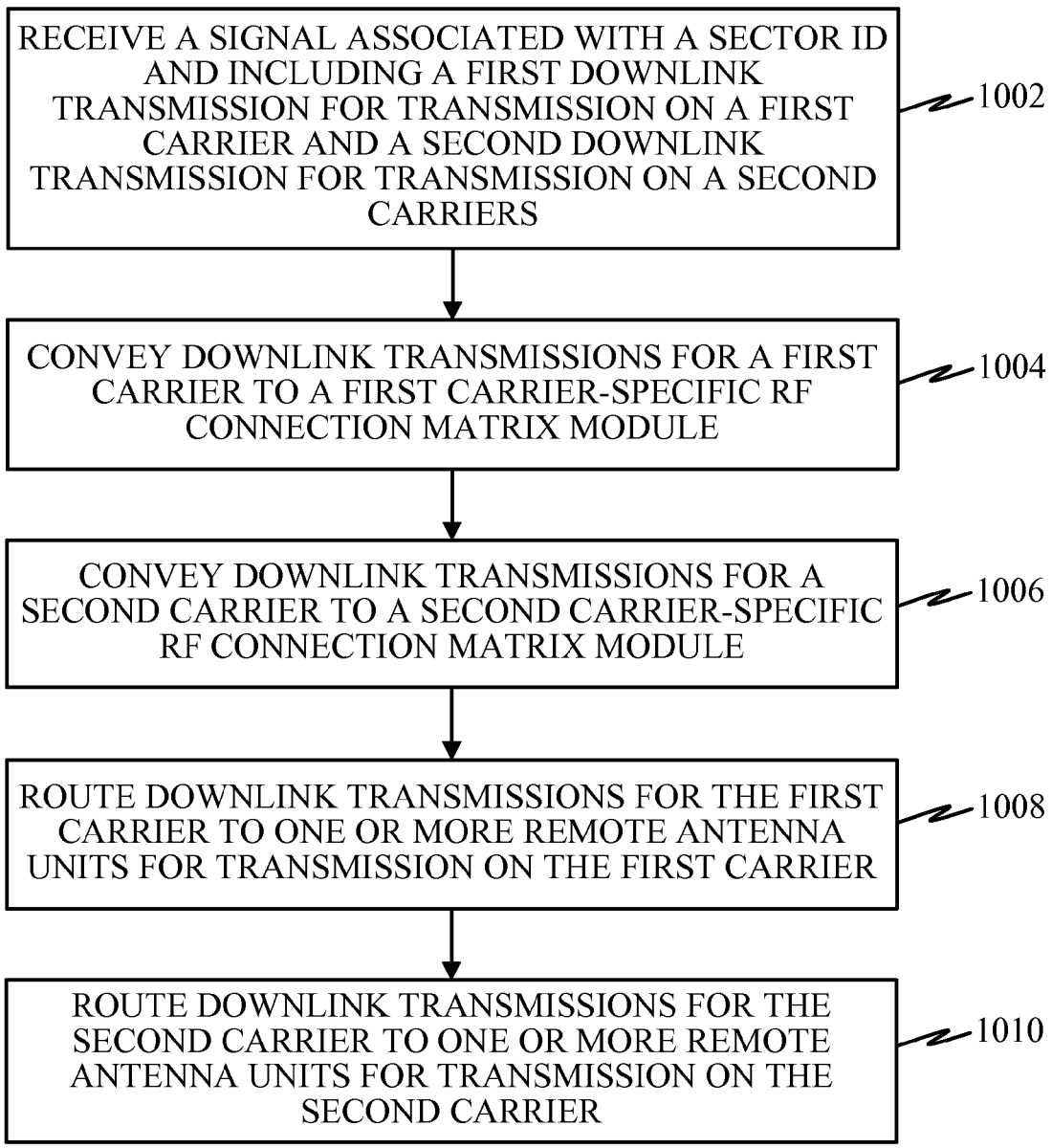
FIG. 10 is a flow diagram illustrating at least one example of a method operational on an RF connection matrix.

Turning to FIG. 10, a flow diagram is shown illustrating at least one example of a method operational on an RF connection matrix, such as the RF connection matrix 704B. Notably, although the following example only refers to two different sector IDs and only two different carriers, it should be understood that the specific number of sector IDs and/or carriers can vary across any of a plurality of different examples. With reference to FIGS. 9 and 10, a signal can be received at step 1002, where the signal is associated with a sector ID and includes downlink transmissions for a plurality of carriers. For example, the RF connection matrix 704B may receive one or more signals from a base station sector controller 712, where the received signal is associated with a sector ID. For instance, the RF connection matrix 704B may receive a signal from the base station sector controller 712A associated with a first sector ID, and a signal from the base station sector controller 712B associated with a second sector ID. The received signal(s) (e.g., from each base station sector controller 712) may include one or more downlink transmissions for transmission on a first carrier and one or more downlink transmissions for transmission on a second carrier. The signal(s) from each base station sector controller 712 may be received at a respective carrier separation filter 904.

At step 1004, downlink transmissions for a first carrier can be conveyed to a first carrier-specific RF connection matrix module 906. For example, the carrier separation filters 904 can filter out downlink transmissions for any carriers other than the first carrier, and can convey the resulting downlink transmissions for the first carrier to the carrier-specific RF connection matrix module 906 for the first carrier. The carrier-specific RF connection matrix module 906 for the first carrier can accordingly receive downlink transmissions for one or more sector IDs associated with the first carrier.

Similarly, at step 1006, downlink transmissions for a second carrier can be conveyed to a second carrier-specific RF connection matrix module 906. For example, the carrier separation filters 904 can filter out downlink transmissions for any carriers other than the second carrier, and can convey the resulting downlink transmissions for the second carrier to the carrier-specific RF connection matrix module 906 for the second carrier. The carrier-specific RF connection matrix module 906 for the second carrier can accordingly receive downlink transmissions for one or more sector IDs associated with the second carrier.

At step 1008, the first carrier-specific RF connection matrix module 906 can route the downlink transmissions for the first carrier to one or more remote antenna units for transmission on the first carrier. For example, the carrier-specific RF connection matrix module 906 for the first carrier can route the downlink transmissions associated with each sector ID for the first carrier to one or more remote antenna units 716. Routing for facilitating simulcasting by two or more remote antenna units 716 can be accomplished by way of RF combining in a manner similar to the RF combining in the electrical portion of the RF connection matrix, as described above relating to the RF connection matrix 704A in FIG. 8.

Similarly, at step 1010, the second carrier-specific RF connection matrix module 906 can route the downlink transmissions for the second carrier to one or more remote antenna units for transmission on the second carrier. For example, the carrier-specific RF connection matrix module 906 for the second carrier can route the downlink transmissions for the second carrier to one or more remote antenna units 716. Routing for facilitating simulcasting by two or more remote antenna units 716 can be accomplished by way of RF combining in a manner similar to the RF combining in the electrical portion of the RF connection matrix, as described above relating to the RF connection matrix 704A in FIG. 8.

In at least some examples where both the first and second carrier-specific RF connection matrix modules 906 may route downlink transmissions to one or more of the same remote antenna units 716. In such an example, the signals received from the two carrier-specific RF connection matrix modules 906 can be combined into a signal by a carrier combine filter 908 prior to transmission by the respective remote antenna units 716.

According to the forgoing examples, the RF connection matrix 704B can implement one or more of the features described herein above with reference to FIGS. 2-5. For example, the carrier-specific RF connection matrix module 906 for the first carrier can simulcast a downlink transmission on the first carrier over a first group of two or more remote antenna units 716 employing a particular sector ID. Furthermore, the carrier-specific RF connection matrix module 906 for the second carrier can simulcast a downlink transmission on the second carrier over a second group of two or more remote antenna units employing the sector ID, wherein at least one remote antenna unit of the second group differs from the remote antenna units of the first group. In another example, the carrier-specific RF connection matrix modules 906 can simulcast downlink transmissions over a plurality of remote antenna units 716, where at least one of the remote antenna units 716 is positioned so that a coverage area associated with the at least one remote antenna unit is not adjacent to a coverage area associated with any of the other remote antenna units of the plurality.

Referring back to FIG. 7, in order to adapt the RF connection matrix 704 (e.g., RF connection matrix 704A in FIG. 8 and/or RF connection matrix 704B in FIG. 9) to perform one or more of the features described herein with reference to FIGS. 2 and 4, the provisioning for a particular simulcasting configuration can be highly complex, involving appropriate electrical and/or optical connections to provide the downlink signal for a particular carrier to the proper remote antenna unit or units 716. In deployments where more than one simulcasting configuration may be desired, the RF connection matrix 704 (e.g., 704A, 704B) must be provisioned to handle all possible simulcast and de-simulcast scenarios. Furthermore, in deployments where it is desired to dynamically change the simulcasting and de-simulcasting configurations, the RF connection matrix 704 (e.g., 704A, 704B) will need to be provisioned with all possible simulcast and de-simulcast scenarios in order for the RF connection matrix 704 (e.g., 704A, 704B) to be able to dynamically adjust according to network traffic dynamics.

In some instances, the programming for the RF connection matrix 704 (e.g., 704A, 704B) may interface with programming at the base station controller 708, so that it can dynamically switch between various simulcasting and de-simulcasting configurations as needed to accommodate traffic dynamics. Such an interface is depicted in FIG. 7 as interface 720. In some instances, such an interface 720 between the RF connection matrix 704 (e.g., 704A, 704B) and the base station controller 708 may be handled manually by the operator.

In some instances, the remote antenna units 716 may be located at varying distances from the RF connection matrix 704. Some remote antenna units 716 may be located relatively close to the RF connection matrix 704, while others are relatively distant therefrom. Accordingly, in a system where multiple remote antenna units 716 are utilized for simulcasting, the propagation delay for the downlink signal to arrive at a distant remote antenna unit 716 might be significantly longer than the propagation delay for the same downlink signal to arrive at the remote antenna unit 716 in closer proximity. During simulcast, it is intended that the same signal be transmitted by each remote antenna unit 716 at the same or substantially the same time. However, if large differences in the length of fiber optic cables (e.g., optic cables 806 in FIG. 8, optic cables 910 in FIG. 9) to each remote antenna unit 716 exist, it may be difficult to synchronize the transmissions, and a delay spread among the simulcast antennas can go beyond the design specifications of the access terminals served by the simulcasting remote antenna units 716. Accordingly, in at least some examples a suitable extra path length may be added at the shorter paths, such as extra lengths of fiber, resulting in an equivalent path length for the simulcasted signals.

According to another feature of the present disclosure, a base station simulcast controller module may be implemented as part of a processing system 600 to facilitate simulcasting downlink transmissions according to one or more of the features described herein, such as those described above with reference to FIGS. 2-5. Such a base station simulcast controller module can enable base stations to simulcast downlink transmissions without employing an RF connection matrix. The base station simulcast controller module may be integrated as part of the processing system 600, such as by being integrated into the base station in some examples. In other examples, the base station simulcast controller module may be implemented as its own processing system 600 adapted to communicate with a plurality of base stations.

Figure 11:
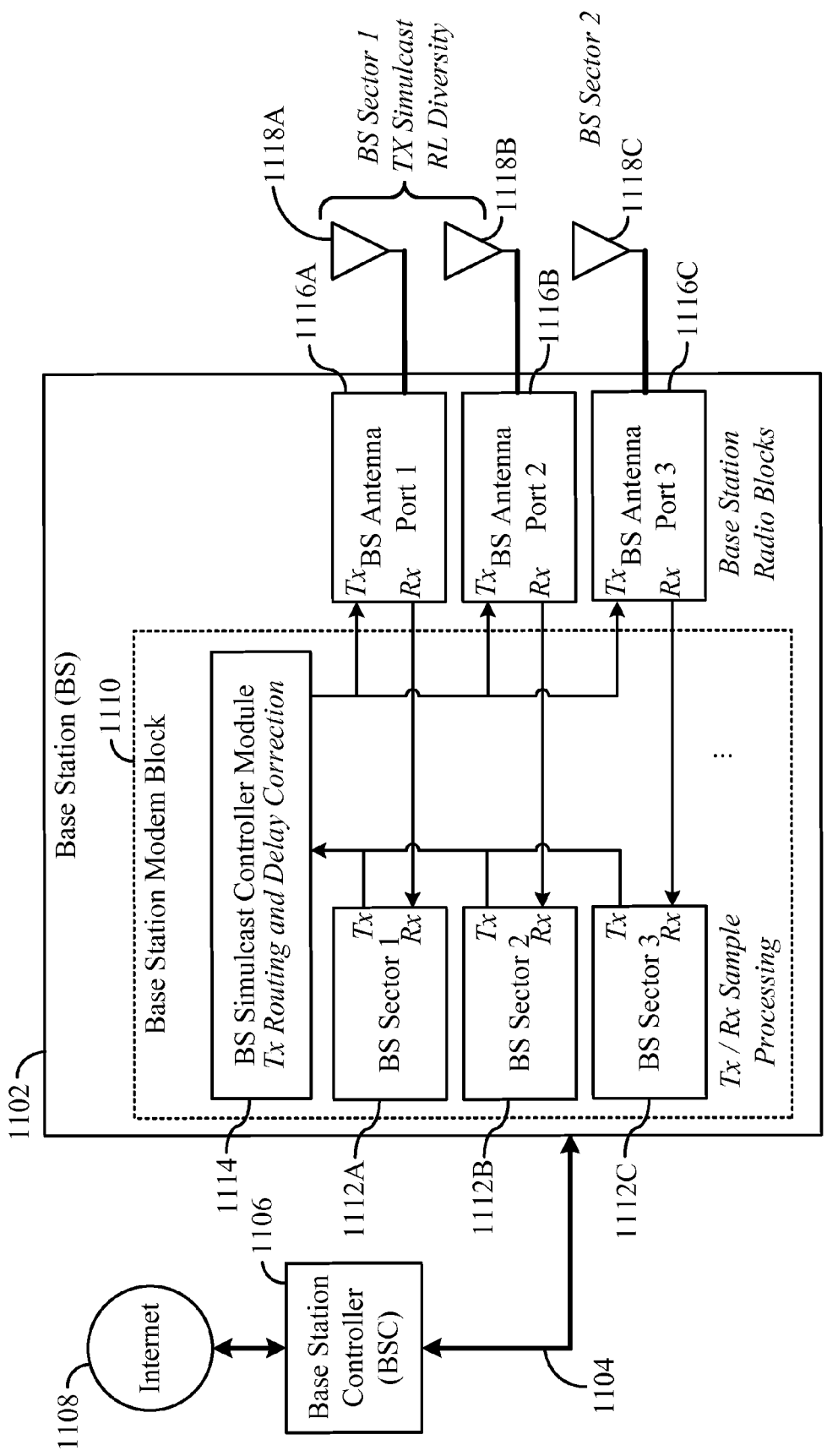
FIG. 11 is a block diagram illustrating a base station including an integrated base station simulcast controller module according to at least one example.

FIG. 11 is a block diagram illustrating select components of a base station including an integrated base station simulcast controller module according to at least one example. That is, FIG. 11 illustrates an example where a processing system is configured as a base station including the base station simulcast controller module integrated as part of the processing system. The illustrated example shows a macro-cell deployment in which multiple base station sectors may be implemented in one form factor rack unit or channel card. Further, the illustrated example shows a single carrier architecture, wherein each of the base station sectors provides communication within the same carrier frequency as one another. However, those of ordinary skill in the art will understand that the modem block may be provisioned to provide multiple carriers, and may be provisioned to implement differing simulcasting group configurations for different carriers as described herein above.

In the illustrated system, a base station 1102 may be utilized alone or in conjunction with one or more additional different base stations the same as base station 1102 or different from base station 1102 in a wireless communication system to enable multiple access wireless communication.

The base station 1102 may include a backhaul interface 1104 enabling backhaul communication with one or more network nodes, such as a base station controller 1106. The base station controller 1106, which may manage general call processing functions, may additionally be communicatively coupled to one or more additional base stations (not illustrated) over similar or different backhaul connections, and may further be communicatively coupled to other network nodes suitable for use in a wireless communication system, such as the Internet 1108.

Further, the base station 1102 may include a base station modem block 1110 including a plurality of base station sector controllers 1112A, 1112B, and 1112C and a base station simulcast controller module 1114. Such a base station simulcast controller module 1114 may also be characterized as a transmit routing and delay correction entity. According to at least one example, the base station simulcast controller module 1114 may be implemented at least in part by a processing circuit. For instance, the processing circuit 602 of FIG. 6, alone or in conjunction with the simulcasting group distribution operations 614 in the storage medium 606, can be employed to implement the base station simulcast controller module 1114.

The base station sector controllers 1112A, 1112B, and 1112C each include sufficient circuitry for transmitting a downlink and receiving an uplink for one sector in the wireless communication system, and may further each include circuitry for user scheduling, for determining a packet transmission format, and for waveform convolution. Here, the illustrated base station modem block 1110 includes three base station sector controllers 1112, but in various aspects of the present disclosure a base station modem block may include any suitable number of base station sector controllers 1112.

Still further, the base station 1102 includes a plurality of base station antenna ports 1116A, 1116B, and 1116C for interfacing with respective remote antenna units 1118A, 1118B, and 1118C. Again, while the illustrated base station 1102 includes three base station antenna ports, in various aspects of the present disclosure a base station 1102 may include any suitable number of base station antenna ports, which may or may not necessarily exactly correspond to the number of base station sector controllers in the base station 1102.

According to various aspects of the present disclosure, the base station simulcast controller module 1114, included in the base station 1102, enables simulcasting and de-simulcasting utilizing the plurality of remote antenna units 1118A, 1118B, and 1118C without the need for the RF connection matrix. That is, the base station sector controllers 1112A, 1112B, and 1112C each include a transmit interface and a receive interface. The transmit interface of each base station sector controller 1112 is communicatively coupled to the base station simulcast controller module 1114, which processes the respective transmit signals as described below for a particular simulcast configuration and accordingly provides the processed transmit signals to one or more respective base station antenna ports 1116A, 1116B, and 1116C. In the illustrated example, the remote antenna units 1118A and 1118B are employed as a simulcasting group for simulcasting downlink transmissions for base station sector 1 on a particular carrier, while remote antenna unit 1118C is employed for de-simulcast transmissions for base station sector 2 on the same carrier. Group configurations for other carriers are omitted for clarity, but they may differ from the group configuration illustrated for the particular carrier.

On the other hand, the receive interface of each base station sector controller 1112 can be communicatively coupled to a respective base station antenna port 1116 without passing the received signals through the base station simulcast controller module 1114. In this way, aspects of the present disclosure enable the base station modem block 1112 to decouple uplink transmissions from downlink transmissions so that uplink capacity can be improved. That is, in accordance with an aspect of the present disclosure, even when a plurality of the remote antenna units 1118 are configured for simulcasting of downlink (forward link) transmissions, the reception of uplink (reverse link) transmissions are handled separately so that the uplink transmissions can be either simulcasted or de-simulcasted independent of whether the downlink transmissions are simulcasted or de-simulcasted. In this way, simulcasting of the downlink can improve the signal to interference and noise ratio (SINR) for an access terminal served by the simulcasted downlinks, while the uplink can additionally be improved with uplink diversity.

Figure 12:
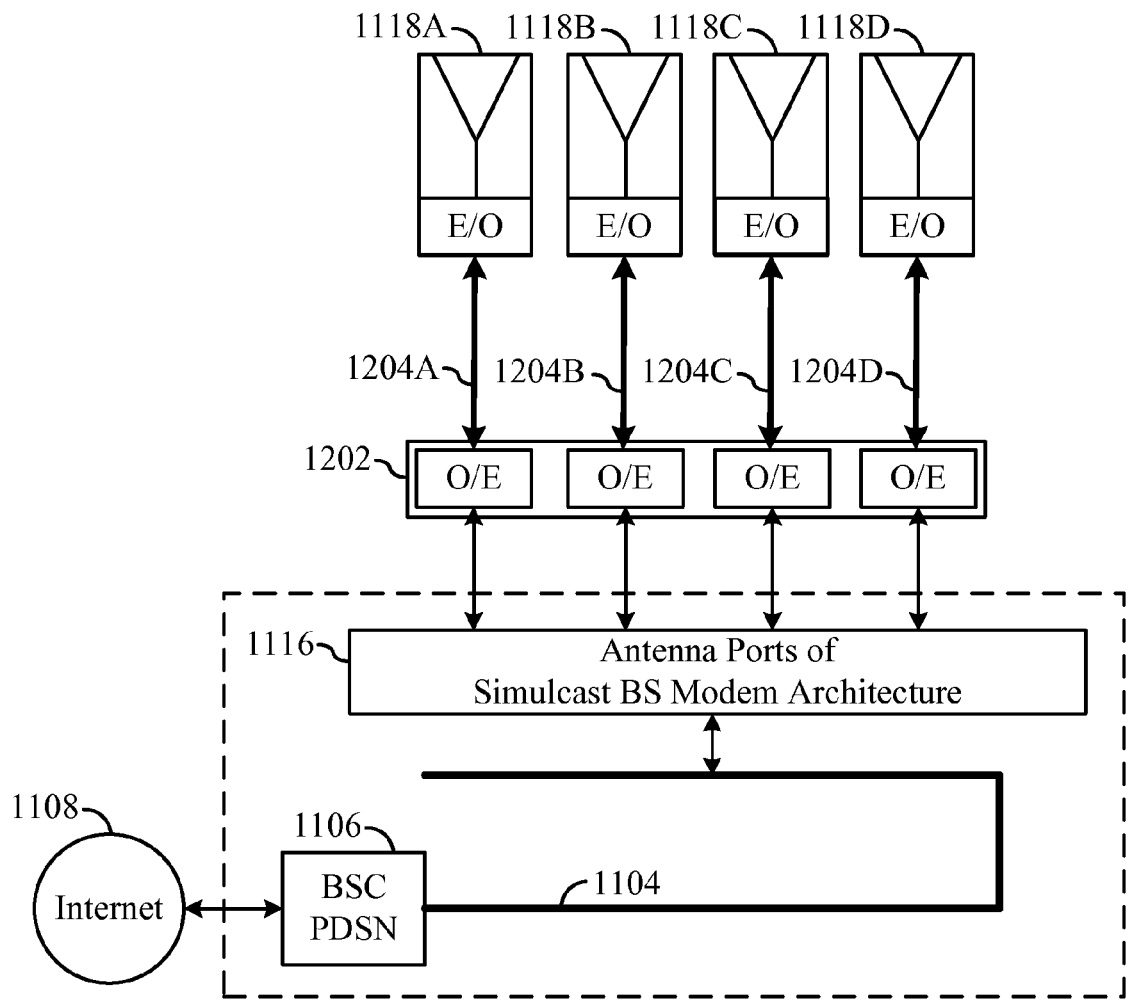
FIG. 12 is a block diagram illustrating additional details relating to the base station of FIG. 11, which includes the integrated base station simulcast controller module according to at least one example.

FIG. 12 is a block diagram detail view showing substantially the same architecture as illustrated in FIG. 11 for a DAS in accordance with an aspect of the present disclosure. Objects in FIG. 12 with the same number as objects in FIG. 11 are the same as those already described, so will not be described in detail with respect to this figure. In the illustration, it can be seen that with this architecture, which replaces the RF connection matrix 704 described above with reference to FIGS. 7-9, connection from the base station 1102 to the remote antenna units 1118 may be simplified. That is, the base station antenna ports 1116 of one or more base stations 1102 may be controlled by the base station controller 1106, which communicates with the respective base stations 1102 over the backhaul interface 1104. While the base stations 1102 with their respective base station modem blocks 1112 are not illustrated, the bus illustrated by the backhaul interface 1104 can be taken to imply that any number of base stations 1102, such as the base station 1102 illustrated in FIG. 11, are in communication with the base station controller, where each respective base station 1102 includes a base station simulcast controller module 1114, one or more base station sector controllers 1112, and one or more base station antenna ports 1116.

As seen in FIG. 12, the interface between respective base station antenna ports 1116 and a central hub 1202 including corresponding O/E interfaces is simplified, as compared to the examples utilizing the RF connection matrix 704 depicted in FIGS. 8 and 9. For instance, as illustrated in FIG. 8, simulcasting might be accomplished by way of RF combining 810. However, simulcasting can be accomplished by the above-described features of the base station simulcast controller module 1114, so RF combining 810 is not required. That is, only one RF connection is required per downlink between each base station antenna port 1116 and O/E interface at the central hub 1202.

Additionally, the interface between respective O/E interfaces at the central hub 1202 and the remote antenna units 1118 is simplified, as compared to the examples utilizing the RF connection matrix 704. For instance, as illustrated in FIG. 8, simulcasting with the RF connection matrix 704A might be accomplished by way of fiber combining 806C. However, as noted, simulcasting can be accomplished by the above-described features of the base station simulcast controller module 1114, so fiber combining 806C is not required. That is, only one optic fiber 1204 can be employed per downlink between the central hub 1202 including the O/E interfaces and the remote antenna units 1118 including the E/O interfaces.

In a further aspect of the present disclosure, for each connection between an O/E interface at the central hub 1002 and a respective E/O interface at a remote antenna unit 1118, the optic fiber 1204 may include one single-mode fiber per downlink and one single-mode fiber per uplink. In this way, each link for sending uplink transmission signals from a remote antenna unit 1118 to the hub 1202 may be de-simulcast, while each link for sending downlink transmission signals from the hub 1202 to a remote antenna unit 1118 can be either simulcast or de-simulcast, as controlled by the base station simulcast controller module 1114.

In yet another aspect of the present disclosure, by virtue of a function of the base station simulcast controller module 1114, the use of extra lengths of fiber as discussed above to address the variable delays for distant remote antenna units, can be eliminated. That is, here, the lengths of the optic fibers 1204 may still vary greatly, and thus, signals transmitted from a central hub 1202 may still exhibit disparate propagation delays in accordance with the differences in length. However, the base station simulcast controller module 1114 may implement buffering for delay correction so that remote antenna units 1118 which are to participate in transmit simulcasting can be synchronized. That is, within the base station simulcast controller module 1114, delays may be adjusted to improve simulcast performance by compensating for fiber-to-antenna delays. Here, delays may be cleanly controlled by software and/or hardware in the base station simulcast controller module 1114, for example, by digital buffering circuitry, to compensate for variable propagation delays. Further, because the digital buffering may be easily adjusted, corrections to delay amounts or changes in delay amounts when a remote antenna unit 1118 is relocated, for example, may be made.

Employing the base station simulcast controller module 1114 to compensate for variable propagation delays, instead of using extra lengths of fiber, can provide substantial improvements to signal to interference and noise ratios (SINR). For instance, it has been discovered that when the relative delay is controlled within one (1) to two (2) chips, where one (1) chip is about 0.8 micro-seconds, then the signal to interference and noise ratio grows linearly with the ratio of total received power from simulcasting antennas to total received power from network. However, if the delay is left to the fiber, then there can be significant loss from the optimal simulcasting signal to interference and noise ratio.

By including the base station simulcast controller module 1114 as described above, the distribution (i.e., configuration) of simulcasting groups can be readily modified to facilitate wireless transmissions for a given traffic scenario at a particular time. Further, the base station 1102 may be capable of dynamically selecting between simulcasting and de-simulcasting distributions for downlink transmissions as needed in accordance with one or more network traffic parameters. That is, at some times, based on at least one network traffic parameter (e.g., a traffic scenario, a network interference topology), improvements in coverage of certain locations may be desired, and thus, that location may be served by simulcasting a downlink from several remote antenna units in that area. Further, at some times, improvements in capacity at certain locations may be desired, and thus, that location may be served by de-simulcasting multiple downlinks from the remote antenna units in that area and/or by redistributing the simulcasting configuration to provide additional sectors for that location. Here, because the change of the routing to the appropriate remote antenna unit 1118 is done electronically and internally to the base station 1102, there is no longer a need for provisioning all possible simulcasting configurations in advance, as was required when utilizing the RF connection matrix. That is, the base station simulcast controller module 1114 provides for improved granularity in the selection of a simulcasting configuration in that potentially every combination of simulcasting and de-simulcasting of the available remote antenna units 1118 may be implemented by a simple software command.

Figure 13:
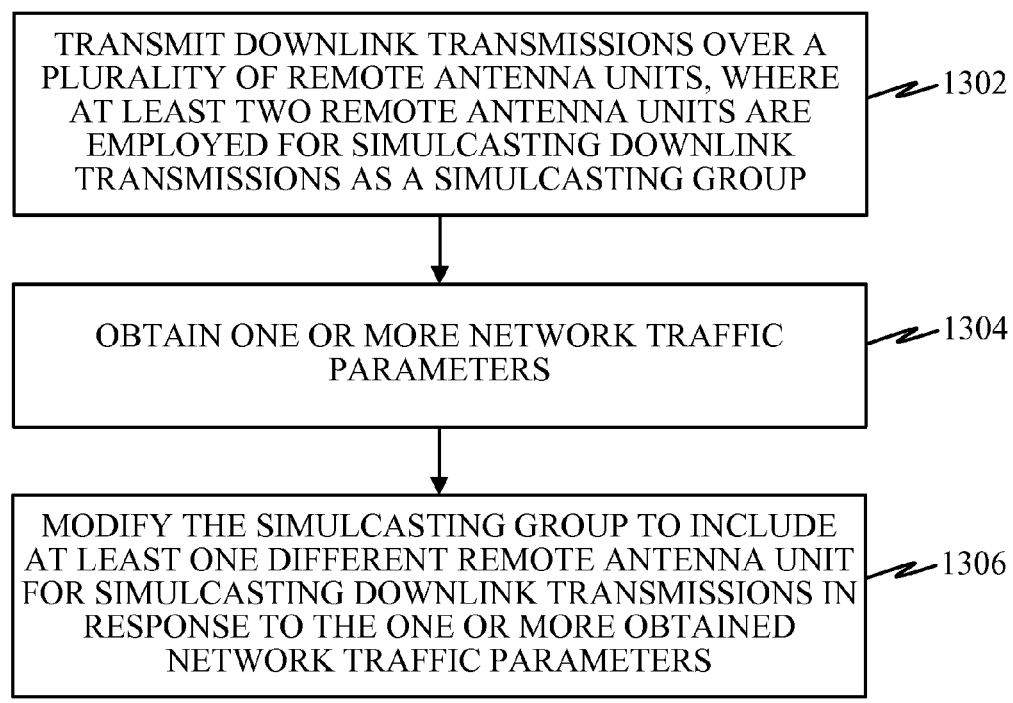
FIG. 13 is a flow diagram illustrating at least one example of a method operational on a base station.

At least one feature of the present disclosure includes methods operational on a base station. FIG. 13 is a flow diagram illustrating at least one example of a method operational on a base station. Referring to FIG. 13 together with FIG. 11, a base station 1102 can transmit, at step 1302, downlink transmissions over a plurality of remote antenna units 1118 (e.g., 1118A, 1118B, 1118C), where at least two of the remote antenna units 1118 (e.g., 1118A and 1118B) are employed for simulcasting downlink transmissions as a simulcasting group. The remote antenna units can be communicatively coupled to the antenna ports 1116 (e.g., 1116A, 1116B, 1116C).

According to at least one example, the base station simulcast controller module 1114 can be adapted to transmit downlink transmissions over a plurality of remote antenna units 1118 communicatively coupled to respective base station antenna ports 1116. In some examples, the base station simulcast controller module 1114 may be adapted to facilitate downlink simulcasting by enabling electronic splitting of a transmit signal from a base station sector controller 1112 to be provided to any number of the base station antenna ports 1116. The base station simulcast controller module 1114 can provide the electronically split transmit signal to each of the remote antenna units 1116 employed for simulcasting the transmit signal.

In some examples, the base station simulcast controller module 1114 can be adapted to simulcast downlink transmissions according to the features described herein with reference to FIGS. 2 and 3 above. For instance, the base station simulcast controller module 1114 can be adapted to simulcast the downlink transmissions on a first carrier over a first group of two or more remote antenna units 1118 employing a particular sector ID, while simulcasting downlink transmissions on a second carrier over a second group of two or more remote antenna units 1118 employing the same sector ID. In such an example, at least one remote antenna unit 1118 of the second group may differ from the remote antenna units 1118 of the first group. The base station simulcast controller module 1114 can further modify which remote antenna units 1118 are included in the first group and/or the second group, as described in more detail below.

In some examples, the base station simulcast controller module 1114 can be adapted to simulcast downlink transmissions according to the features described herein with reference to FIGS. 4 and 5 above. For instance, the base station simulcast controller module 1114 can be adapted to simulcast the downlink transmissions over the plurality of remote antenna units 1118 where at least one remote antenna unit 1118 is positioned so that a coverage area associated with this at least one remote antenna unit 1118 is not adjacent to a coverage area associated with any of the other remote antenna units 1118 of the plurality. The base station simulcast controller module 1114 can further modify which remote antenna units 1118 are included in the simulcasting group, as described in more detail below.

According to at least some examples, the base station 1102 can be further adapted to receive uplink transmissions over the plurality of remote antenna units that are de-simulcasted, even when downlink transmissions are simulcasted. For example, the base station sector controllers 1112A, 1112B, and 1112C can each include a transmit interface and a receive interface. The transmit interface can be communicatively coupled to the base station simulcast controller module 1114 for facilitating simulcasted downlink transmissions, and the receive interface can be communicatively coupled to a respective base station antenna port 1116 without passing the received signals through the base station simulcast controller module 1114. Accordingly, even when a plurality of the remote antenna units 1118 are configured for simulcasting of downlink (forward link) transmissions, the reception of uplink (reverse link) transmissions from the plurality of remote antenna units 1118 are handled separately so that the uplink transmissions can be de-simulcasted independent of whether the downlink transmissions are simulcasted or de-simulcasted.

At step 1302, the base station 1102 can obtain one or more network traffic parameters. For example, the base station simulcast controller module 1114 may be adapted to obtain the one or more network traffic parameters. In some instances, the base station 1102 can obtain the one or more network traffic parameters by receiving a communication from the base station controller 1106. As a result of the base station 1102 being adapted to communicate with the base station controller 1106 by way of the backhaul interface 1104, knowledge of network traffic parameters, such as traffic usage and loading, can be readily exchanged to change the simulcasting configuration when such a change would be beneficial. This can occur within carriers over time, or between carriers. In some examples, the base station controller 1106 can determine a suitable group distribution (e.g., configuration) of some simulcasting remote antenna units and some de-simulcasting remote antenna units, in accordance with the traffic scenario, by communicating directly with the base station 1102. For instance, the base station controller 1106 may monitor traffic usage across the remote antenna units 1118, and may utilize this information to optimally apply simulcasting and de-simulcasting in accordance with the traffic usage. In this example, the base station controller 1106 may provide network traffic parameters in the form of commands or instructions to the base station 1102. The base station 1102 (e.g., the base station simulcast controller module 1114) can thereby readily change the simulcasting group distributions in accordance with these instructions.

In other examples, the base station controller 1106 may provide the network traffic parameters in the form of traffic information to the base station simulcast controller module 1114 by way of the backhaul connection 1104, and the base station simulcast controller module 1114 may utilize this traffic information to make a determination regarding a change of the simulcasting configuration internally in accordance with the received traffic information. That is, the base station simulcast controller module 1114 may be adapted to make a determination relating to a change in the routing path of the transmit signal based on received information corresponding to traffic usage.

In response to the one or more network traffic parameters, the base station 1102 can modify the simulcasting group configuration(s) at step 1306. For example, the base station 1102 (e.g., the base station simulcast controller module 1114) can modify a simulcasting group to include at least one different remote antenna unit 1118 for simulcasting downlink transmissions. That is, the base station simulcast controller module 1114 can remove and/or add one or more remote antenna units 1118 included in a simulcasting group. In some examples, the base station simulcast controller module 1114 may be adapted to modify a simulcasting group by changing the routing path of a transmit signal received from a base station sector controller 1112 to transmit to a different remote antenna port 1116 for simulcasting downlink transmissions.

Figure 14:
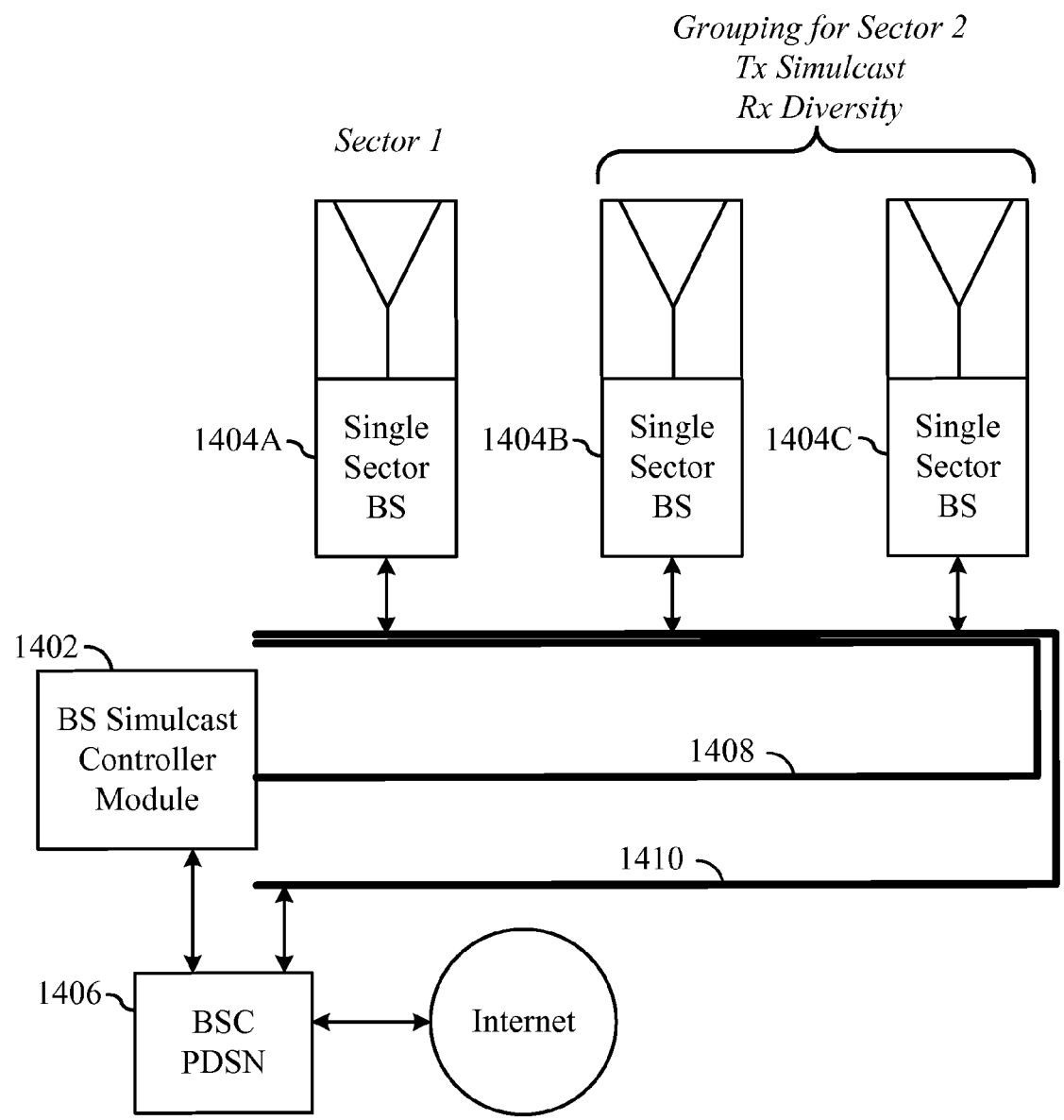
FIG. 14 is a block diagram illustrating select components of at least one example of a distributed antenna system (DAS) employing a base station simulcast controller module implemented as a processing system adapted to communicate with a plurality of base stations.

As noted above, some configurations for a base station simulcast controller module include the base station simulcast controller module implemented as its own processing system 600 adapted to communicate with a plurality of base stations. FIG. 14 is a block diagram illustrating select components of a distributed antenna system (DAS) employing a base station simulcast controller module 1402 implemented as a processing system adapted to communicate with a plurality of base stations. Configurations such as the one depicted by FIG. 14 may be suitable for implementing a distributed antenna system (DAS) with a plurality of base stations employed as pico cells 1404 (e.g., 1404A, 1404B, and 1404C). That is, the base station simulcast controller module 1114 illustrated in FIG. 11 is integrated into a base station 1102 that may generally be referred to as a macro cell, in which it is common to implement a plurality of base station sectors, e.g., by including the base station sector controllers 1112. On the other hand, a pico cell 1404 (e.g., 1404A, 1404B, and 1404C) may typically include a controller for one or two base station sectors. In the illustration of FIG. 14, each pico cell 1404A, 1404B, 1404C is shown as a single-sector base station, although aspects of the present disclosure can apply to multi-sector pico cells.

With this architecture, since the pico cells 1404 are separated, the architecture including a central base station simulcast controller module 1114 from FIG. 11 does not necessarily apply. Still, in accordance with various aspects of the present disclosure, some coordination for simulcasting of downlink transmissions through the backhaul connecting the pico-cells 1404 together may be desired. It should be understood that when reference is made below to one or more functional aspects of the base station simulcast controller module 1402, such functional aspects can be implemented by a processing circuit of the base station simulcast controller module 1402, such as the processing circuit 602 implementing the simulcasting group distribution operations 614 shown in FIG. 6.

In accordance with an aspect of the present disclosure, the architecture illustrated in FIG. 14 includes a base station simulcast controller module 1402, which is communicatively coupled to a plurality of single-sector base stations 1404A, 1404B, and 1404C and to a base station controller 1406. The base station simulcast controller module 1402 can be communicatively coupled through a first backhaul interface 1408 to the plurality of single-sector base stations 1404A, 1404B, and 1404C, for example, utilizing a very low latency and low bandwidth connection configured for simulcasting control. The base station simulcast controller module 1402 can be communicatively coupled to the base station controller 1406 and to the plurality of base stations 1404 by means of a communications interface, such as the communications interface 604 described above with referent to FIG. 6.

The base station controller 1406 may also be communicatively coupled with the respective base stations 1404 through a second backhaul interface 1410. Here, the second backhaul interface 1410 may be a low latency connection for conventional communication of uplink and downlink packets between the base station controller 1406 and the base stations 1404.

The base station simulcast controller module 1402 may be adapted to provide the respective base stations 1404 over the first backhaul interface 1408 with simulcasting control instructions or commands to implement simulcasting or de-simulcasting, as needed, from the respective base stations 1404. The simulcasting control instructions may be in accordance with one or more obtained traffic parameters (e.g., traffic usage information provided by the base station controller 1406). Further, the base station simulcast controller module 1402 may direct the base station controller 1406 to send the same downlink packets across two or more base stations 1404 in simulcast, where the two or more base station 1404 all use the same sector identity (ID) for the simulcast. As illustrated, a first base station 1404A is configured for de-simulcasting the downlink transmission from its sector (e.g., sector 1), and a second base station 1404B and third base station 1404C are configured to simulcast a downlink transmission for a different sector (e.g., sector 2). Of course, the base station simulcast controller module 1402 may configure the respective base stations 1404 to any suitable simulcasting configuration in accordance with various aspects of the present disclosure. Additionally, the depicted configuration may be implemented for a one carrier, while a different simulcast/de-simulcast configuration may be implemented for a different carrier, such that different carriers employ different grouping configurations.

In a further aspect of the present disclosure, when a plurality of base stations such as the second base station 1404B and the third base station 1404C are configured for simulcast, the base station simulcast controller module 1402 may select one of the plurality of simulcasting base stations 1404B or 1404C to be a master, so that the other base station(s) in simulcast will be slave(s). Here, the selected master base station in the simulcast group may run a scheduler, and may select which users will be served. Further, the base station simulcast controller module 1402 may ensure that users selected by the master base station are known to the slave base station(s), so that all simulcasting base stations properly format the same user packet selected for transmission across the simulcasting base stations.

In this architecture, since all base stations 1404 and the base station simulcast controller module 1402 are directly communicating with the base station controller 1406, which manages general call processing, the knowledge of traffic usage and loading can be readily exchanged to dynamically change the simulcasting configuration when needed.

As described herein above, the uplink signals may operate separately from each base station 1404, to improve the capacity for uplink transmissions from access terminals to the respective base stations 1404. Further, since the modem at each base station 1404 may operate across multiple carriers, this architecture enables independent simulcasting configurations to occur between carriers, as well as dynamically changing simulcasting configuration across carriers over time. In general, the present architecture including the base station simulcast controller module 1402 can be employed for implementing any of the various simulcasting distributions described herein above with reference to FIGS. 2-5, except that one or more of the remote antenna units in those examples can be implemented by base stations 1404 in the present example. That is, the base station simulcast controller module 1402 can be adapted to select the simulcasting base stations 1404 to implement any of the features and configurations described above with reference to FIGS. 2-5.

In yet a further aspect of the present disclosure, the architecture illustrated in FIG. 14 utilizes communication interfaces over the respective backhaul interfaces 1410 and 1408, such that RF-over-fiber connections for coupling the base station 1404 to distant remote antenna units are not needed. Thus, special circuitry to process differential propagation delays over variable-length optic fiber cables may not be necessary in this architecture. Nonetheless, due to differences in distance for the propagation of the backhaul signal over the second backhaul interface 1410, at least one of the base station simulcast controller module 1402 or the base station controller 1406 may be provisioned to suitably handle variable delays so that the simulcasted signals from the respective base stations 1404 are at least substantially synchronized.

Figure 15:
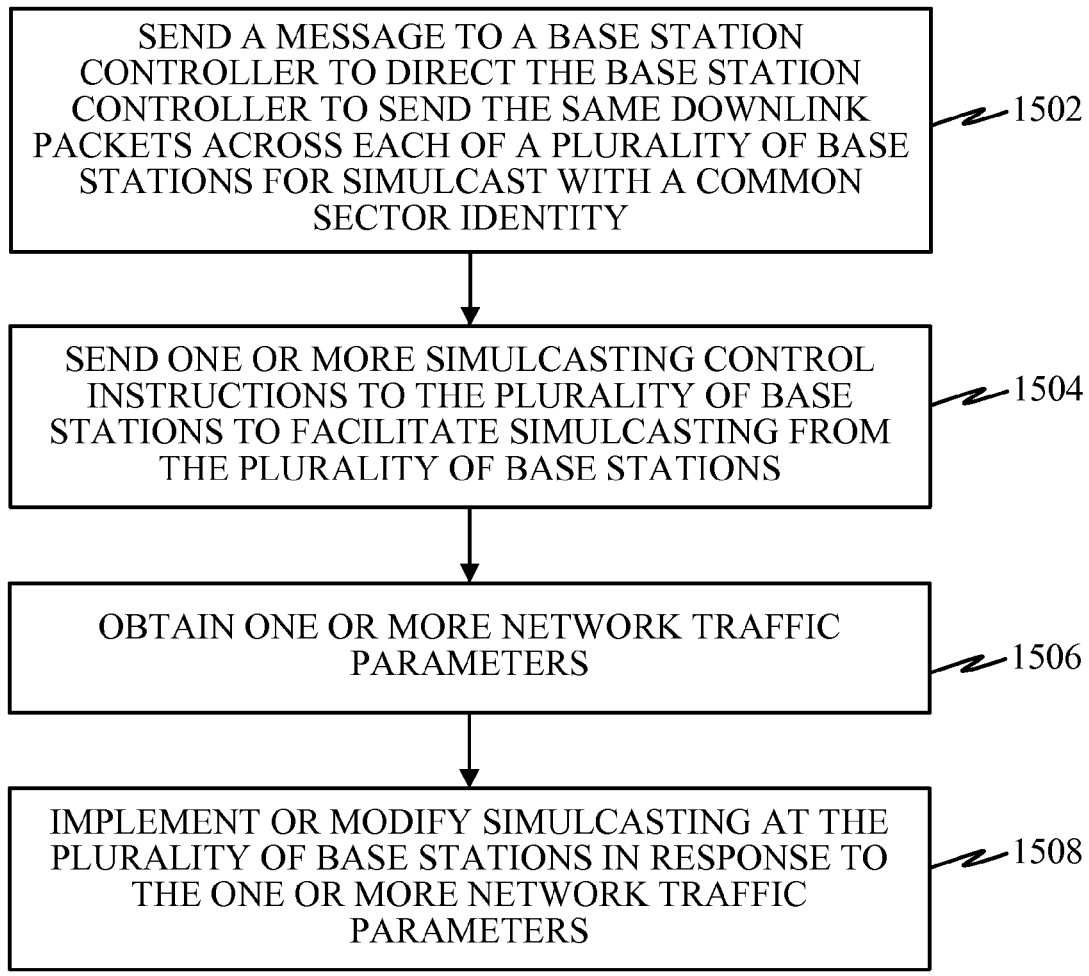
FIG. 15 is a flow diagram illustrating at least one example of a method operational on a base station simulcast controller module.

Further aspects of the present disclosure are related to methods operational for a base station simulcast controller module, such as the base station simulcast controller module 1402. FIG. 15 is a flow diagram illustrating at least one example of such a method. Referring to FIGS. 14 and 15, a base station simulcast controller module 1402 may send a message to a base station controller to direct the base station controller to send the same downlink packets across each of a plurality of base stations for simulcast with a common (i.e., the same) sector identity (ID), at step 1502. For example, a processing circuit (e.g., the processing circuit 602 implementing the simulcasting group distribution operations 614 shown in FIG. 6) can be adapted to generate and transmit the message to a base station controller 1406 to direct the base station controller 1406. The transmitted message may also identify the sector ID to be employed by the plurality of remotely deployed base stations.

According to various features, the processing circuit may be adapted to select the plurality of base stations in accordance with the various features described above with reference to FIGS. 2-5. For example, the processing circuit may be adapted select the plurality of base stations to include a first group of two or more base stations for simulcasting downlink transmissions on a first carrier with a sector ID, and a second group of two or more base stations for simulcasting downlink transmissions on a second carrier with the same sector ID. At least one base station of the second group can differ from the two or more base stations making up the first group. In another example, the processing circuit can be adapted to select the plurality of base stations to include at least one base station that is located so that a coverage area associated with that at least one base station is not adjacent to a coverage area associated with any of the other base stations of the plurality.

At step 1504, the base station simulcast controller module 1402 can send one or more simulcasting control instructions to the plurality of base stations. The one or more simulcasting control instructions may be adapted for facilitating simulcasting from the plurality of base stations. In at least one example, the processing circuit (e.g., the processing circuit 602 implementing the simulcasting group distribution operations 614 of FIG. 6) can be adapted to send the one or more simulcasting control instructions to the plurality of base stations 1404 over a backhaul interface 1408.

In some implementations, the base station simulcast controller module 1402 may obtain one or more network traffic parameters, as indicated by step 1506. For example, the processing circuit (e.g., the processing circuit 602 implementing the simulcasting group distribution operations 614 in FIG. 6) may obtain traffic parameters, such as a traffic scenario or a network interference topology. The processing circuit may obtain such network traffic parameters from the base stations 1404, the base station controller 1406, or a combination thereof.

At step 1508, the base station simulcast controller module 1402 can implement or modify simulcasting at the plurality of base stations in response to the one or more traffic parameters. For instance, the processing circuit (e.g., the processing circuit 602 implementing the simulcasting group distribution operations 614 in FIG. 6) may evaluate the network traffic parameters and/or an instruction associated with the network traffic parameters and responsively implement or modify a simulcasting configuration according to those traffic needs.

According to one or more other implementations, a method may also include steps for selecting a master base station and one or more slave base stations, as described above, and/or synchronizing the downlink transmissions from the plurality of base stations. Such additional or alternative steps can be carried out by the processing circuit (e.g., the processing circuit 602 implementing the simulcasting group distribution operations 614 in FIG. 6).

One or more of the components, steps, features and/or functions illustrated in FIGS. 1, 2, 3, 4, 5, 6, 7, 8, 9, 10, 11, 12, 13, 14 and/or 15 may be rearranged and/or combined into a single component, step, feature or function or embodied in several components, steps, or functions. Additional elements, components, steps, and/or functions may also be added without departing from the scope of the present disclosure. The apparatus, devices and/or components illustrated in FIGS. 1, 4, 6, 7, 8, 9, 11, 12 and/or 14 may be configured to perform one or more of the methods, features, or steps described in FIGS. 2, 3, 4, 5, 10, 13 and/or 15. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A base station, comprising:
    a plurality of antenna ports, each antenna port adapted to be communicatively coupled to a respective remote antenna unit;
    a plurality of base station sector controllers, each base station sector controller comprising a receive interface communicatively coupled to at least one antenna port of the plurality of antenna ports, and a transmit interface; and
    a base station simulcast controller module coupled with each of the plurality of antenna ports and coupled with the transmit interface of each of the plurality of base station sector controllers, the base station simulcast controller module adapted to:
        transmit downlink transmissions over a plurality of remote antenna units communicatively coupled to the antenna ports, wherein at least two remote antenna units are employed for simulcasting downlink transmissions as a simulcasting group;
        obtain one or more network traffic parameters; and
        modify the simulcasting group to include at least one different remote antenna unit for simulcasting downlink transmissions in response to the one or more network traffic parameters.

2. The base station of claim 1, wherein the base station simulcast controller module is adapted to simulcast the downlink transmissions over the at least two remote antenna units by:
    enabling electronic splitting of a transmit signal; and
    providing the electronically split transmit signal to each of the at least two remote antenna units for simulcasting the transmit signal.

3. The base station of claim 1, wherein the base station simulcast controller module adapted to transmit downlink transmissions over a plurality of remote antenna units communicatively coupled to the antenna ports includes the base station simulcast controller module adapted to:
    simulcast downlink transmissions on a first carrier over a first group of two or more remote antenna units employing a sector identity (ID); and
    simulcast downlink transmissions on a second carrier over a second group of two or more remote antenna units employing the sector ID, wherein at least one remote antenna unit of the second group differs from the remote antenna units of the first group.

4. The base station of claim 3, wherein the base station simulcast controller module adapted to modify the simulcasting group to include at least one different remote antenna unit for simulcasting downlink transmissions in response to the one or more network traffic parameters includes the base station simulcast controller module being adapted to:
    modify the first group, the second group, or both the first group and the second group.

5. The base station of claim 1, wherein the base station simulcast controller module adapted to transmit downlink transmissions over a plurality of remote antenna units communicatively coupled to the antenna ports includes the base station simulcast controller module adapted to:
    simulcast downlink transmissions over the plurality of remote antenna units, wherein at least one of the remote antenna units is positioned so that a coverage area associated with the at least one remote antenna unit is not adjacent to a coverage area associated with any of the other remote antenna units of the plurality.

6. The base station of claim 1, wherein the one or more network traffic parameters include at least one of a user traffic pattern across a plurality of geographic regions served by the remote antenna sites, or a network interference topology.

7. The base station of claim 1, wherein the base station simulcast controller module adapted to obtain the one or more network traffic parameters comprises the base station simulcast controller module being adapted to receive a transmission from a base station controller indicating the one or more network traffic parameters.

8. The base station of claim 1, wherein the base station simulcast controller module is further adapted to synchronize downlink transmissions for simulcasting from the plurality of remote antenna sites.

9. The base station of claim 8, wherein the base station simulcast controller module is adapted to synchronize downlink transmissions with a buffer circuit adapted to add delay to a signal before the signal reaches a respective antenna port.

10. The base station of claim 1, wherein the plurality of base station sector controllers are adapted to receive de-simulcasted uplink transmissions independent of whether downlink transmissions are simulcasted or de-simulcasted, wherein the de-simulcasted uplink transmissions are associated with one or more uplink diversity branches of a particular sector identity (ID).

11. A method operational on a base station, comprising:
    conveying respective transmit signals from each of a plurality of base station sector controllers to a base station simulcast controller module;
    providing the transmit signals from the base station simulcast controller module to a plurality of antenna ports communicatively coupled to respective remote antenna units, wherein at least two remote antenna units are employed for simulcasting downlink transmissions as a simulcasting group; and receiving at respective base station sector controllers uplink transmissions from the two or more remote antenna units via respective antenna ports without passing the uplink transmissions through the base station simulcast controller module, wherein the uplink transmissions are de-simulcasted and associated with one or more uplink diversity branches of a particular sector identity (ID).

12. The method of claim 11, further comprising:
enabling electronic splitting of at least one transmit signal at the base station simulcast controller module; and
providing the at least one electronically split transmit signal to each of the at least two remote antenna units for simulcasting the transmit signal.

13. The method of claim 11, wherein transmitting downlink transmissions over a plurality of remote antenna units comprises:
simulcasting downlink transmissions over the plurality of remote antenna units, wherein at least one of the remote antenna units is positioned so that a coverage area associated with the at least one remote antenna unit is not adjacent to a coverage area associated with any of the other remote antenna units of the plurality.

14. The method of claim 11, further comprising:
synchronizing downlink transmissions for simulcasting from the plurality of remote antenna sites.

15. The method of claim 14, wherein synchronizing downlink transmissions for simulcasting from the plurality of remote antenna sites comprises:
adding a delay to a signal prior to the signal reaching a respective antenna port associated with a respective remote antenna unit.

16. The method of claim 11, further comprising:
obtaining one or more network traffic parameters; and
modifying the simulcasting group to include at least one different remote antenna unit for simulcasting downlink transmissions in response to the one or more network traffic parameters.

17. The method of claim 16, wherein providing the transmit signals from the base station simulcast controller module to the plurality of antenna ports communicatively coupled to respective remote antenna units comprises:
simulcasting downlink transmissions on a first carrier over a first group of two or more remote antenna units employing a sector identity (ID); and
simulcasting downlink transmissions on a second carrier over a second group of two or more remote antenna units employing the sector ID, wherein at least one remote antenna unit of the second group differs from the remote antenna units of the first group.

18. The method of claim 17, wherein modifying the simulcasting group to include at least one different remote antenna unit for simulcasting downlink transmissions in response to the one or more network traffic parameters comprises:
modifying which remote antenna units are included in the first group, the second group, or both the first group and the second group.

19. The method of claim 16, wherein obtaining the one or more network traffic parameters comprises:
receiving a transmission from a base station controller indicating the one or more network traffic parameters.

20. A base station apparatus, comprising:
means for conveying respective transmit signals from each of a plurality of base station sector controllers to a base station simulcast controller module;
means for providing the transmit signals from the base station simulcast controller module to a plurality of antenna ports communicatively coupled to respective remote antenna units, wherein at least two remote antenna units are employed for simulcasting downlink transmissions as a simulcasting group; and
means for receiving uplink transmissions at respective base station sector controllers from the two or more remote antenna units employed for simulcasting downlink transmissions via respective antenna ports without passing the uplink transmissions through the base station simulcast controller module, wherein the uplink transmissions are de-simulcasted and associated with one or more uplink diversity branches of a particular sector identity (ID).

21. The base station apparatus of claim 20, further comprising:
means for simulcasting downlink transmissions on a first carrier over a first group of two or more remote antenna units employing a sector identity (ID); and
means for simulcasting downlink transmissions on a second carrier over a second group of two or more remote antenna units employing the sector ID, wherein at least one remote antenna unit of the second group differs from the remote antenna units of the first group.

22. The base station apparatus of claim 20, further comprising:
means for simulcasting downlink transmissions over the plurality of remote antenna units, wherein at least one of the remote antenna units is positioned so that a coverage area associated with the at least one remote antenna unit is not adjacent to a coverage area associated with any of the other remote antenna units of the plurality.

23. The base station apparatus of claim 20, further comprising:
means for synchronizing downlink transmissions for simulcasting from the plurality of remote antenna sites.

24. The base station apparatus of claim 20, further comprising:
means for obtaining one or more network traffic parameters; and
means for modifying the simulcasting group to include at least one different remote antenna unit for simulcasting downlink transmissions in response to the one or more network traffic parameters.

25. A non-transitory machine-readable medium comprising instructions operational on a base station, which when executed by a processor causes the processor to:
convey respective transmit signals from each of a plurality of base station sector controllers to a base station simulcast controller module;
provide the transmit signals from the base station simulcast controller module to a plurality of antenna ports communicatively coupled to respective remote antenna units, wherein at least two remote antenna units are employed for simulcasting downlink transmissions as a simulcasting group; and
receive uplink transmissions at respective base station sector controllers from the two or more remote antenna units via respective antenna ports without passing the uplink transmissions through the base station simulcast controller module, wherein the uplink transmissions are de-simulcasted and associated with one or more uplink diversity branches of a particular sector identity (ID).

26. The machine-readable medium of claim 25, further comprising instructions operational on a base station to cause the processor to:

synchronize downlink transmissions for simulcasting from the plurality of remote antenna sites.

27. The machine-readable medium of claim 25, further comprising instructions operational on a base station to cause the processor to:

obtain one or more network traffic parameters; and modify the simulcasting group to include at least one different remote antenna unit for simulcasting downlink transmissions in response to the one or more network traffic parameters.

* * * * *